US009729623B2

(12) United States Patent
Huang et al.

(10) Patent No.: US 9,729,623 B2
(45) Date of Patent: Aug. 8, 2017

(54) SPECIFICATION-GUIDED MIGRATION

(71) Applicant: International Business Machines Corporation, Armonk, NY (US)

(72) Inventors: Yun-Wu Huang, Chappaqua, NY (US); Pu Jin, Beijing (CN); Fan Jing Meng, Beijing (CN); Michael Montinarelli, Penn Yan, NY (US); Kristiann J. Schultz, Chatfield, MN (US); Bo Yang, Beijing (CN); Christopher C. Young, Sleepy Hollow, NY (US); Xiaolan Zhang, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 513 days.

(21) Appl. No.: 14/214,823

(22) Filed: Mar. 15, 2014

(65) Prior Publication Data

US 2015/0264128 A1 Sep. 17, 2015

(51) Int. Cl.
*H04L 29/08* (2006.01)
*G06F 9/50* (2006.01)

(52) U.S. Cl.
CPC ........ *H04L 67/1014* (2013.01); *G06F 9/5061* (2013.01); *H04L 67/1006* (2013.01)

(58) Field of Classification Search
CPC . H04L 67/1014; H04L 67/1006; H04L 69/08; H04L 67/06; G06F 9/5061; G06F 9/5007; G06F 9/5072

USPC ........................................................ 709/203
See application file for complete search history.

(56) References Cited

U.S. PATENT DOCUMENTS

| | | | |
|---|---|---|---|
| 2011/0035754 A1* | 2/2011 | Srinivasan | G06F 9/4856 718/105 |
| 2011/0126197 A1 | 5/2011 | Larsen et al. | |
| 2011/0276951 A1 | 11/2011 | Jain | |
| 2012/0131567 A1 | 5/2012 | Barros et al. | |
| 2012/0303776 A1* | 11/2012 | Ferris | G06F 9/5072 709/223 |
| 2013/0212553 A1 | 8/2013 | Balasubramanian | |
| 2013/0247136 A1 | 9/2013 | Chieu et al. | |
| 2015/0039764 A1* | 2/2015 | Beloglazov | H04L 47/70 709/226 |

OTHER PUBLICATIONS

Amazon Web Services, downloaded from http://aws.amazon.com/ec2/vmimport/ on Dec. 19, 2013.
Peter Mell and Tim Grance, "The NIST Definition of Cloud Computing". National Institute of Standards and Technology, Information Technology Laboratory, Version 15, Oct. 7, 2009.
Yun-Wu Huang, et al "Conformance Specification and Checking for Hosting Services". unpublished U.S. Appl. No. 14/214,819, filed Mar. 15, 2014.

(Continued)

*Primary Examiner* — Tu Nguyen
(74) *Attorney, Agent, or Firm* — Louis J Percello; Otterstedt, Ellenbogen & Kammer, LLP

(57) ABSTRACT

A conformance checker is received on a system that contains hostable content, and is executed. One or more results provided by the conformance checker are evaluated; and the hostable content is migrated to a destination host in accordance with the evaluating step.

14 Claims, 27 Drawing Sheets

(56) References Cited

OTHER PUBLICATIONS

Kamal Bhattacharya et al, "Migration to Managed Clouds". unpublished U.S. Appl. No. 13/689,363, filed Nov. 29, 2012.
Rema Ananthanarayanan et al, "Adjustment to Managed-Infrastructure-as-a-Service Cloud Standard". unpublished U.S. Appl. No. 13/688,452, filed Nov. 29, 2012.

* cited by examiner

SPECIFICATION-GUIDED MIGRATION

FIELD OF THE INVENTION

The present invention relates to the electrical, electronic and computer arts, and, more particularly, to cloud computing and the like.

BACKGROUND OF THE INVENTION

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. In cloud computing, providers offer their services according to several models: Infrastructure as a Service (IaaS), Platform as a Service (PaaS), and Software as a Service (SaaS). In an Infrastructure as a Service (IaaS) cloud, for example, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). In a PaaS cloud, for example, the capability provided to the consumer is to deploy onto the cloud infrastructure consumer-created or acquired applications created using programming languages and tools supported by the provider. In a SaaS cloud, for example, the capability provided to the consumer is to use the provider's applications running on a cloud infrastructure.

The hosting service provider (e.g. a managed infrastructure as a cloud) imposes a set of requirements on the source hostable contents/entity that are hosted. The source hostable entity needs to conform to these requirements to ensure the content being migrated will function properly after the migration.

SUMMARY OF THE INVENTION

Principles of the invention provide techniques for specification-guided migration. In one aspect, an exemplary method includes the steps of: receiving a conformance checker on a system that contains hostable content; executing the conformance checker; evaluating one or more results provided by the conformance checker; and migrating the hostable content to a destination host in accordance with the evaluating step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide conformance and checking techniques with one or more of the following advantages:

significant coverage (percentage of instances and then workloads where the method can be used),
low cost, which in particular is bounded by manual work needed,
short migration times (as change windows/permitted outages are typically short),
low risk (e.g., of application outages beyond the planned ones),
predictability (i.e., workloads chosen for this strategy will likely succeed in it), A particularly pertinent advantage of one or more embodiments of a specification guided migration technique is that it provides a high degree of predictability to the migration. This predictability allows for more accurate planning of the overall migration from both a business and technical perspective. Other advantages stem from this, such as the lowering of risk to the functionality of an application. For example, if a specification is not available or not able to be checked in an automatic fashion then a migration could lead to some unknown number of issues which would need to be manually debugged. Through the progress of debugging there would be considerable risk to the application that an individual changes something incorrectly in an attempt to resolve the initial issue. This change could involve the loss of data for example. From a business perspective this information allows for more accurate costing of a migration, in that the cost associated which remediating the non-conformances are well known in advance and these figures can be incorporated into the business case. From a technical perspective this information allows technical staff to ensure they possess the appropriate skills at the time of migration to remediate the prior known non-conformances These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
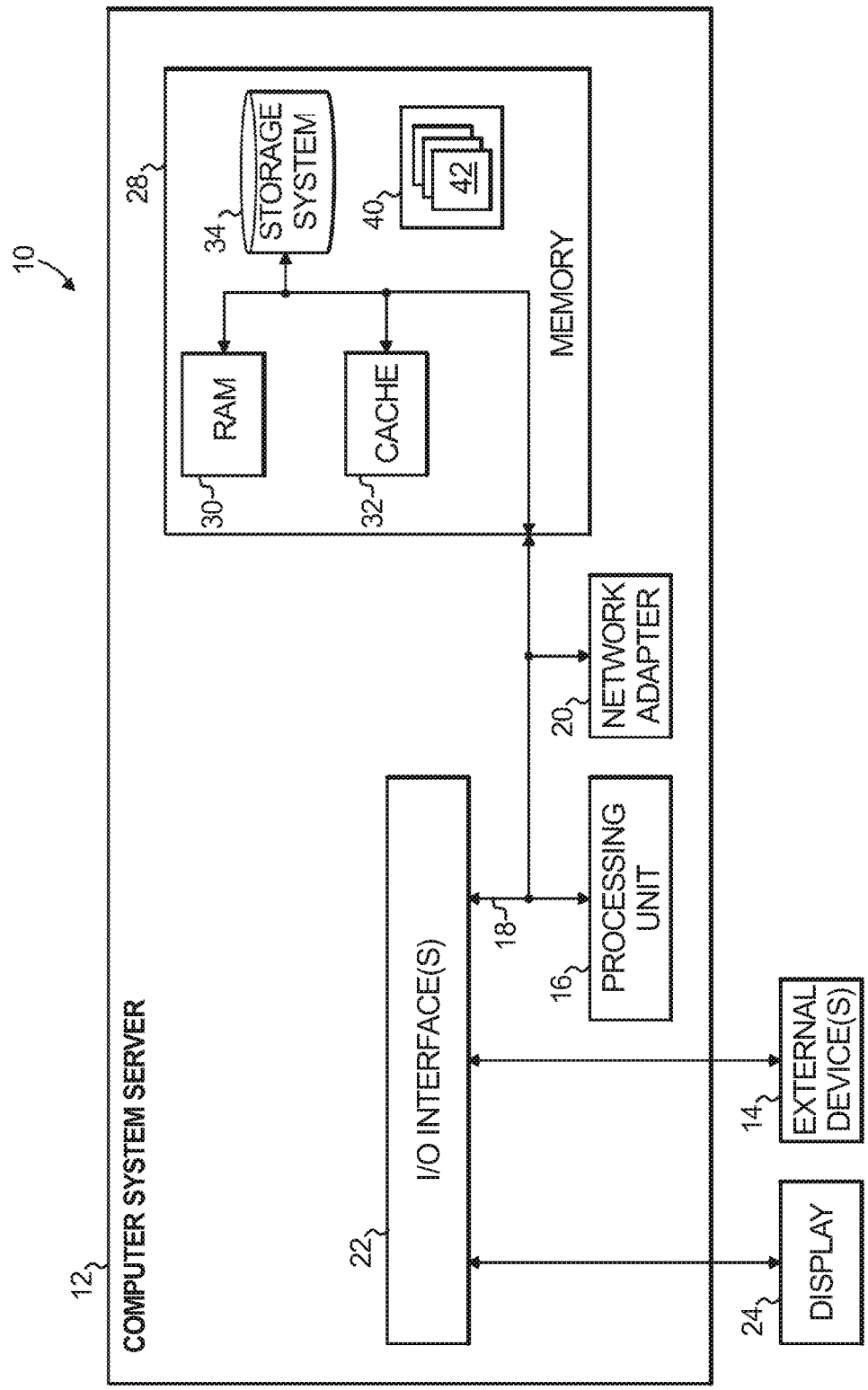
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
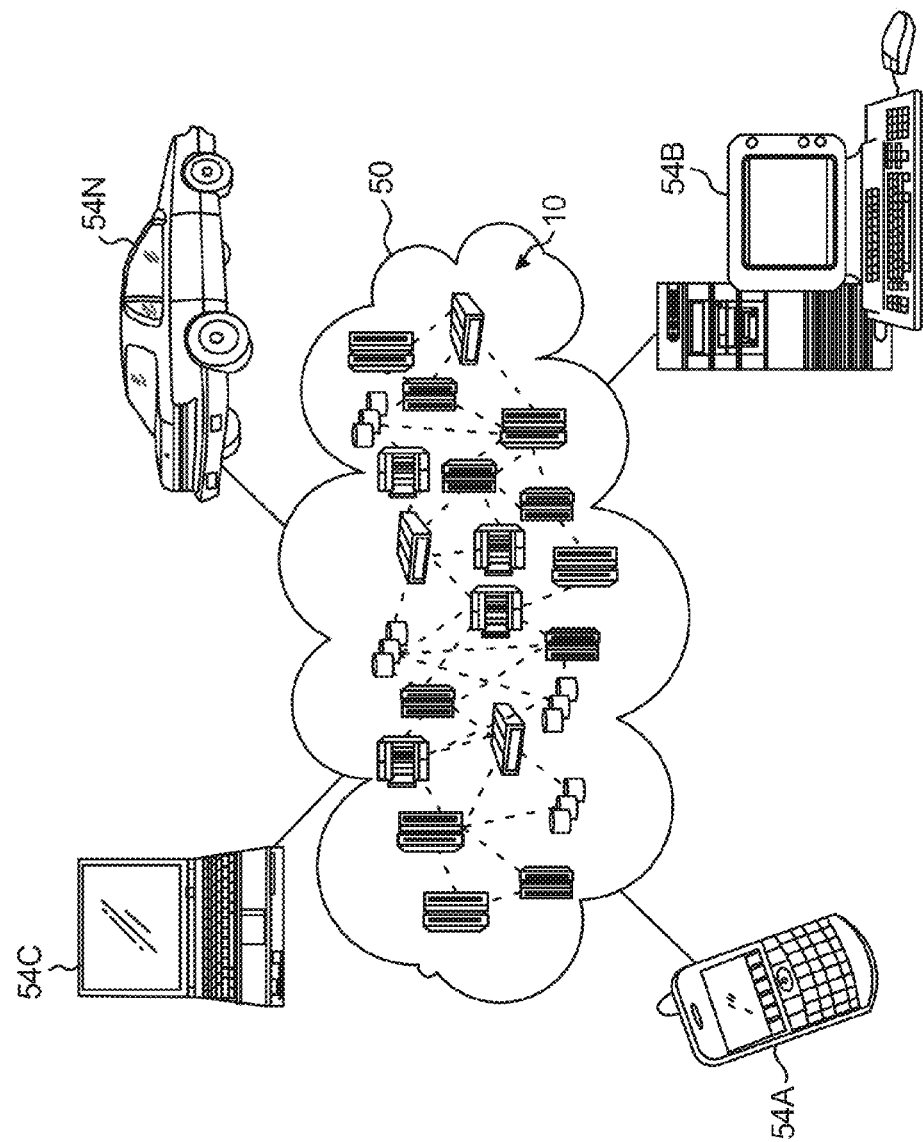
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
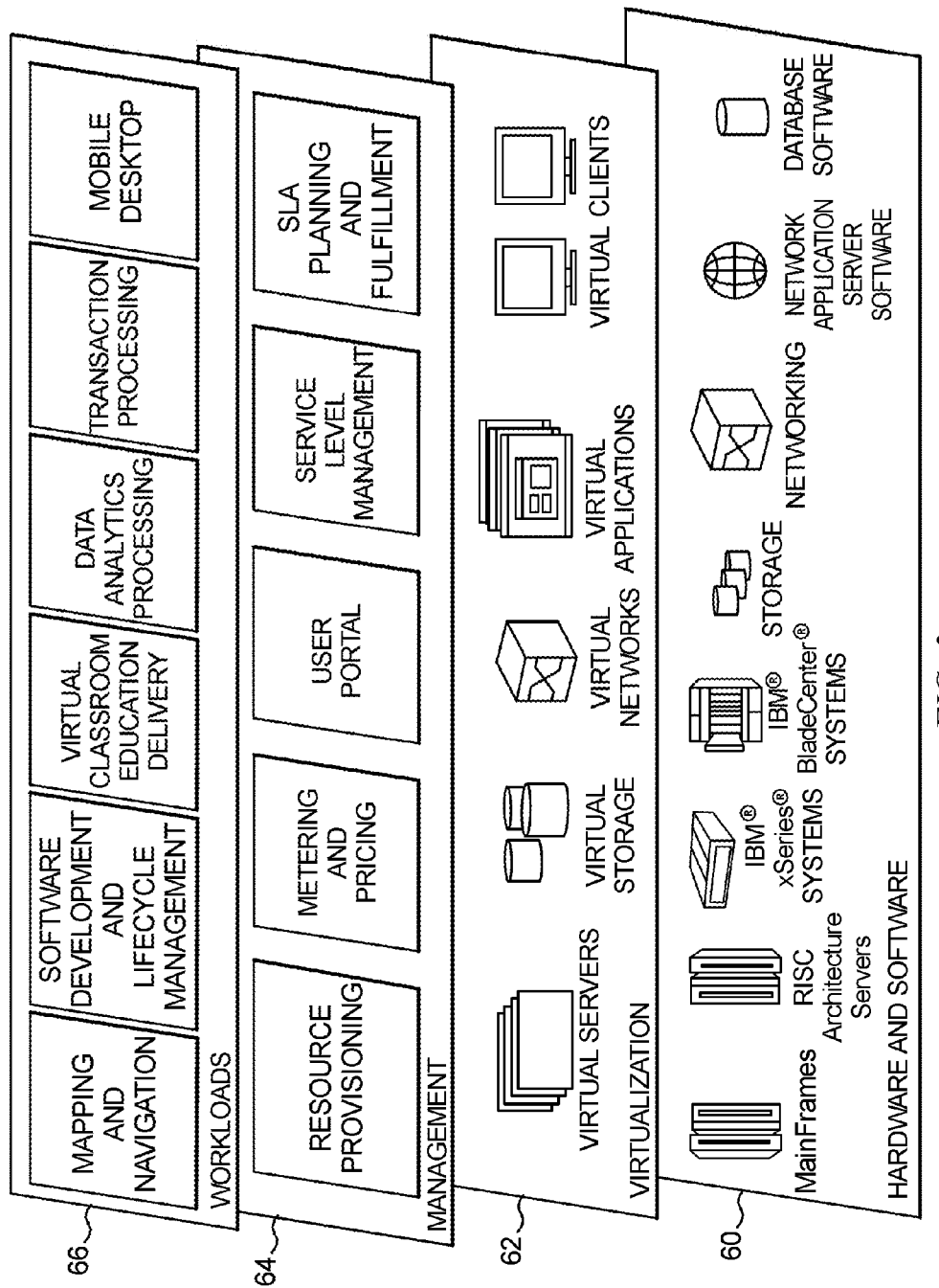
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The hosting service provider (e.g. a managed infrastructure as a cloud) imposes a set of requirements on the contents that are hosted. These requirements typically have to be met before the contents can be migrated from the source to the host. Some requirements may be imposed due to the finite set of resources provided by the cloud hosting service provider for cost concerns. Examples of these resources include the limited variety of OS types and their versions, a maximum size of memory and disk sizes offered for potential computing systems to migrate to the cloud. Computing systems that do not satisfy these requirements will likely fail to migrate to the cloud. These requirements are typically published in a document form available to potential customers. Some of these requirements may be described in a way that makes it unclear to the customers whether their computing systems satisfy the requirements. For example, a requirement may be that a candidate computer system have certain network features turned on without specifying how the customer can test whether the features on a computer system are on.

Other requirements are implicit in nature and are not well-known to the customers. For example, during the migration process of a computing system to a managed cloud infrastructure, certain common system (i.e., OS) commands are invoked on the computing system to perform certain tasks. Such migration process requirements are imposed by the internal programming approaches, and therefore may not be known to the public. Additionally, some enterprises may disable some of these commands on their servers due to security concerns. If these servers with disabled commands are to be migrated to the cloud, the aforementioned migration process will fail. In some prior-art approaches, requirements imposed by the cloud hosting services are either described in documents or not known to the public. They do not exist in codified form, unlike the conformance specifications described in embodiments of the current invention.

A conformance specification (or specification) of one or more embodiments is a unit of meta information that includes the description and other attributes of hosting environment, plus a scripting language code that executes the task of the specification on a computing system. The task of a specification is to check if one or more features on a computing system satisfy one or more requirements imposed by the hosting environment; it can also be used to change one or more features on a computing system to satisfy one or more requirements imposed by the hosting environment. The specification objects can be added to a database, deleted or updated from the database that stores them. They can also be queried and classified into categories for easy management. Since the specifications of one or more embodiments include their own script code for executing their respective tasks, customers using services having the features of the current invention are not burdened to know how to test whether their computing systems satisfy the requirements modeled by the specifications.

A hosting service/destination host provider imposes a set of requirements on the contents that are hosted. A host is an entity that can host content. For example, a host might be a hypervisor, a server, a laptop, a mobile phone, a cloud (IaaS, PaaS, SaaS). A current host is where the hostable contents/entity currently resides. A destination host is the desired host where the hostable contents/entity should reside. Hostable content/entity is some computer content that runs on a host. For example, for virtualization, the hostable content/entity is a virtual machine; for IaaS, the hostable content/entity is an instance (e.g., RHEL 6.1 instance running in IBM SCE+); for PaaS, the hostable content/entity is an application (e.g., Ruby on Rails application running in Cloud Foundry or OpenShift); and for SaaS, the hostable content/entity is content/data (e.g., Document in Google Docs, Apple iWork, etc.). Hostable contents/entities are migrated to destination hosts. Some examples of hostable contents migrated to destination hosts are: the migration of a customer owned virtual machine (VM) into IBM SCE+(VM to IaaS instance); the migration of the Node.j s application from a local server onto Cloud Foundry; and the migration of laptop Lotus Symphony documents to Google Docs (to SaaS).

VMware vSphere and KVM are examples of hypervisors that would host virtual machines.

In some instances, in order for the source or hostable content to function properly at the destination host after migration, some level of remediation is performed on the source content to meet requirements. Some examples of remediation are: a customer virtual machine is updated to enable ssh access before it will operate in a new environment; Node.js app.js file is updated to interface with Cloud Foundry services; and Lotus Symphony docs removes document links before being moved to Google Docs. Without a fine-grained machine-level specification of the hosting environment, the remediation of the source contents to conform to the destination requirements are performed in an ad hoc, trial and error fashion. For example, in the case of a migration into a managed IaaS cloud, the customer virtual machine image would need to be moved into the destination cloud before it has been made conforming. Thus, once the virtual machine reaches the cloud/host environment, it is "broken" or unusable unless it can be adjusted so that it conforms to the host environment requirements. In some instances, it may not be economically viable to adjust the virtual machine to conform to the host environment requirements. There may also be considerable risk with migration as it may be technically impossible to adjust the image to conform to the host environment. Such an approach also poses high skill level requirements on the migration engineers, and sometimes even requires privileges access to internal host environment (e.g., cloud) components in order for the migration engineer to "fix" the "broken" image.

The lack of an explicit conformance specification may lead to a number of migration problems, such as, for example, an ad hoc, trial and error approach of migrating hostable contents, which may lead to high failure rates of the source/hostable contents migrating. The reason for the migration failure is also hard to diagnose, in some instances taking a few weeks. Sometimes, the migration itself takes a relatively long time to fail, if it is going to fail, because the failure does not manifest until the end of the migration process. Further compounding migration difficulties, the specification may be frequently changed or updated as requirements of the hosting services change or the programming approaches of the migration process are updated, for example. In other words, the specification itself is considered, in some embodiments, to be a moving target.

One or more embodiments of the invention provide a system, method and/or apparatus for addressing one or more problems associated with content migration to a hosting service provider, and in particular provide a systematic and flexible approach to migration that allows self-service migration to be easily implemented. This is achieved, in some embodiments, with a novel methodology of codifying conformance requirements of the hosting service in a specification, where the requirements are fine-grained, precise rules suitable for automatic checking One or more embodiments include a conformance checker that automatically checks the specification against the source content (e.g., source server), such that the conformance checker and spec guide the migration. For each item in the source content that is found nonconforming to the specification, an estimate is provided, in one or more embodiments, of the level of effort to make the item conform. In terms of an example usage case, the specification and conformance checker provide: a systematic approach to migrating into a hosting environment, with self-service migration as an example; and steady state conformance checking.

Again, one or more embodiments of the invention provide a system, method and/or apparatus for addressing one or more problems associated with content migration to a hosting service provider, and in particular provide a systematic and flexible approach to migration that allows self-service migration to be easily implemented. This is achieved, in some embodiments, with a novel methodology that uses a conformance checker and conformance specification to guide the migration. The requirements of the hosting service provider are included, in one or more embodiments, in a conformance specification ("spec"). The methodology does not require privileged access to the destination host, and includes evaluating the conformance of hostable content to the conformance spec/destination host specification ("spec"); iteratively remediating deviations of the hostable content from the spec, either manually or automatically, at a flexible pace; providing notification when the hostable content or entity is in conformance with the spec; ensuring the hostable content will function on the destination host prior to the migration event; and ensuring the hostable content will function on the destination host after the migration event. In some embodiments, the hostable/source content is validated for conformance to the destination host prior to migration. In other words, once the conformance of the source content to the destination spec has been established, it is safe to move the hostable content to the destination host. In some embodiments, the hostable content is migrated or imported to the destination host prior to its being made to conform to the spec, if the destination host supports adjustments to the hostable content to make the hostable content conform to the spec. In other words, if the target hosting environment (e.g. destination host) supports import of hostable content that is temporarily non-conforming to the spec, the adjustments to the hostable content to make it conform can occur after migration.

A benefit of one or more embodiments of the invention is flexibility in that the source content can migrate first, and be made to conform later or migrate last, and be made to conform first. Another benefit of one or more embodiments of the invention is informed decision making, as for each non-conforming item of a source content, users are given detailed information on a wide range of migration-related aspects, such as technical feasibility, risk, labor, etc., which will be described further below. In some embodiments, the detailed information is provided individually or in aggregate fashion. Another benefit of one or more embodiments of the invention is that it is cost effective, by preventing unnecessary migration failures due to non-compliance conformance issues.

In one or more embodiments, the requirements of the hosting service provider are included, in a conformance specification ("spec"). In some embodiments of the invention, a conformance specification (or specification) is a unit of meta information that includes the description and other attributes of the attribute, plus a scripting language code that executes the task of the specification on a computing system. In one or more embodiments, the task of a specification is to check if one or more features on a computing system satisfy one or more requirements imposed by the hosting environment; the task can also be to change one or more features on a computing system to satisfy one or more requirements imposed by the hosting environment. In one or more embodiments, the specification objects/tasks are added to, deleted or updated from the database that stores them. They can also be queried and classified into categories for easy management. Since the inventive specifications include their own script code for executing their respective tasks, customers using services having the features provided by embodiments of the invention are not burdened to know how to test if their computing systems satisfy the requirements modeled by the specifications.

In at least some embodiments, the methodology does not require privileged access to the destination host, and includes evaluating the conformation of hostable content to the conformance spec/destination host specification ("spec"); iteratively remediating deviations of the hostable content from the spec, either manually or automatically, at a flexible pace; providing notification when the hostable content or entity is in conformance with the spec; ensuring the hostable content will function on the destination host prior to the migration event; and ensuring the hostable content will function on the destination host after the migration event. In some embodiments, the hostable/source content is validated for conformance to the destination host prior to migration. If the source content conforms to the destination specification then it will not compromise the functionality of the application or the functionality of the host/cloud. In other words, once the conformance of the source content to the destination spec has been established, it is safe to move the hostable content to the destination host. In some embodiments, the hostable content is migrated or imported to the destination host prior to its being made to conform to the spec, if the destination host supports adjustments to the hostable content to make the hostable content conform to the spec. In other words, if the target hosting environment (e.g. destination host) supports import of hostable content that is temporarily non-conforming to the spec, the adjustments to the hostable content to make it conform can occur after migration.

A benefit of one or more embodiments of the invention is flexibility in that the source content can migrate first, and be made to conform later or migrate last, and be made to conform first. Another benefit of one or more embodiments of the invention is informed decision making, as for each non-conforming item of a source content, users are given detailed information on a wide range of migration-related aspects, such as technical feasibility, risk, labor, etc., which will be described further below. In some embodiments, the detailed information is provided individually or in aggregate fashion. Another benefit of one or more embodiments of the invention is that it is cost effective, by preventing unnecessary migration failures due to non-conformance issues.

Figure 4:
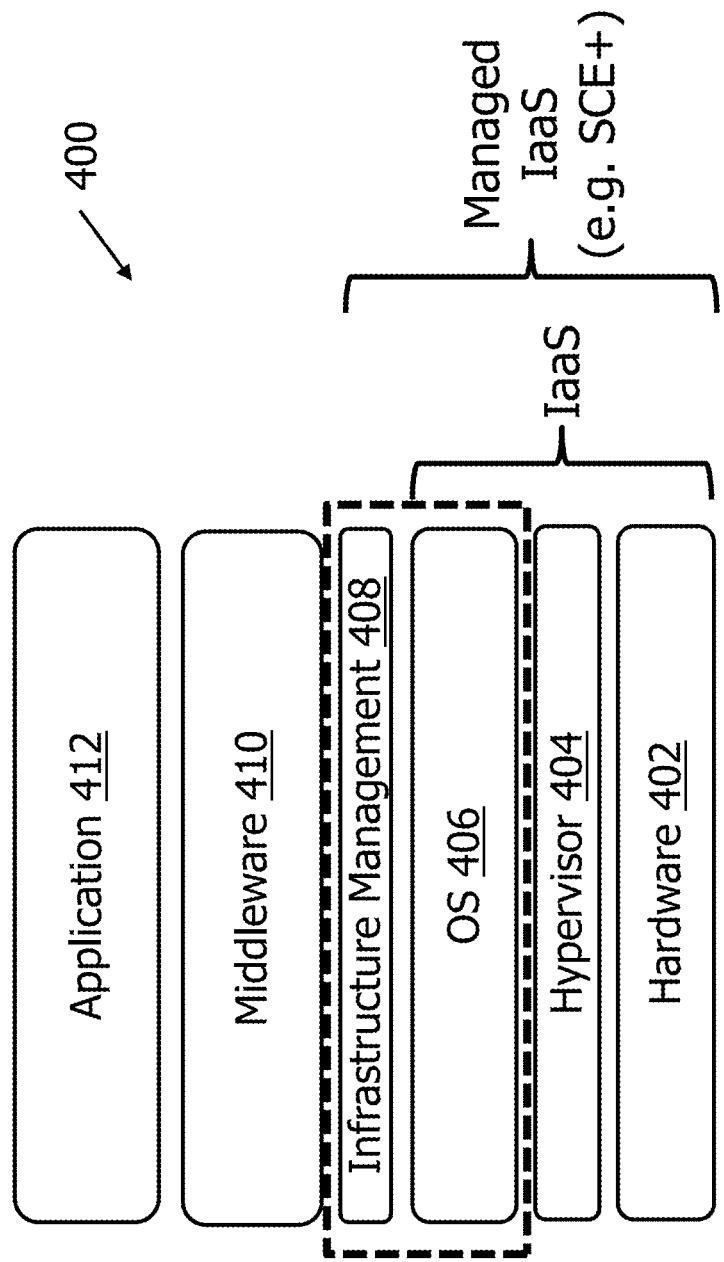
FIG. 4 presents an example hosting environment according to an aspect of the invention.

Referring now to FIG. 4, illustrative hosting service environment 400 is depicted. In the hosting service environment 400, hardware 402, hypervisor 404, and the operating system (OS) 406 are part of an IaaS cloud. In a managed IaaS cloud, (e.g., SmartCloud Enterprise+ (SCE+)) software available from International Business Machines Corporation, Armonk, N.Y., USA), an added infrastructure management layer 408 is included. The cloud consumer controls and/or owns the middleware 410 and application 412. For the hosting service provider to host the cloud consumer content, the content, in one or more embodiments, complies with a conformance specification of the hosting service provider. In one or more embodiments, the conformance specification is the minimum set of OS-level requirements that ensure conformance to the standard OS (operating system) types and allow the management layer 408 to be installed and functional. OS type is an example of a specification that the conformance checker can check, and the conformance checker can check conformance of other specifications related to other features and/or requirement.

The different cloud types may have different specifications for conformance checking before migration can occur. For example, where an IaaS cloud is the destination host, and the source content (e.g., virtual machine) is to be migrated from a migration server virtual center (e.g., vCenter available from VMware, Inc., Palo Alto, Calif., USA) to SCE+, for example, a conformance checker includes, in some embodiments, a specification for checking the OS version, a specification for checking for patches, a specification for checking for conflicting and/or incompatible management agents, a specification for checking for software to be installed, a specification for checking for security compliance, and a specification for checking for environment compatibility. If the source content passes the conformance checking, migration can occur. For example, an image of the source content is imported to the cloud (e.g., IBM's Smart Cloud Enterprise Plus, also known as SCE+ or E+). Stated in another way, if the source content passes the conformance check, migration can occur; then the image can be hosted on the target cloud, in this case, it means the image can be imported and registered with the cloud, and expected to be functioning properly.

In some embodiments of the invention, a guest system to be migrated to a managed hosting environment goes through a step called "MakeManageable" during the migration process. The "MakeManageable" step takes a guest system and ensures that all of the correct management agents of the guest system, e.g., a software application responding to the cloud management services, are installed properly. To achieve this, the "MakeManageable" step, in some embodiments, deletes any incompatible management agents that already exist in the guest system, and installs the correct management agents that do not exist in the guest system. In some embodiments, the "MakeManageable" step involves the execution of complex script code which, when executed, requires resources on the guest system to run properly. Non-limiting examples of these resources include the need for a temporary directory to store temporary files and data, the need for some network features to be turned on for network communication, etc. If the requirements for these resources are not met, the "MakeManageable" step will fail and the entire migration process will not succeed. In one or more embodiments, the conformance checker also includes specifications that check if a guest system satisfies the requirements imposed by the "MakeManageable" step.

As another example, where a PaaS cloud is the destination host, and the source content (e.g., Ruby on Rails application) is to be migrated from a Linux server with Ruby interpreter to a Cloud Foundry PaaS, a conformance check includes a specification checking the version of Rails, a specification checking the runtime allowed (memory, central processing unit (CPU), ports), a specification checking the services available (i.e., databases, queues, etc.), and a specification checking the file storage location and/or configurations for the Ephemeral file system. If the content passes the conformance checking, migration can occur (e.g. it can be hosted on Cloud Foundry). During migration, standard vmc commands, i.e., commands issued using Cloud Foundry's command line interface, are used to push the application to the Rails runtime; and monitoring and scaling rules appropriate for the application are deployed.

As another example, where a SaaS cloud is the destination host, and the source content (e.g., customer relationship management data) is migrated from an in-house customer relationship management (CRM) application to salesforce dot com (spelled out to avoid inclusion of browser-executable code in accordance with USPTO rules) SaaS, a conformance checker includes a specification checking if the data structures are correct, a specification checking for syntactically valid values, and a specification checking that the size of the data is supported. If the source content passes the conformance checking, migration can occur (e.g., content can be hosted on salesforce dot com (spelled out to avoid inclusion of browser-executable code in accordance with USPTO rules)). During migration, the data is loaded into salesforce dot com (spelled out to avoid inclusion of browser-executable code in accordance with USPTO rules), and the data is brought online and associated with customer accounts.

As another example where an SaaS is the destination host, and the source content (e.g., documents) are migrated to Google Docs, a conformance checker includes a specification checking the size of the document, a specification checking the formatting elements used with the document, and a specification checking for special features (e.g., drawings, dynamic elements). If the source content passes the conformance checker, the document can be hosted on Google docs and migration can occur. During migration, the data is uploaded to Google Docs, and the uploaded documents can then be accessed and shared by other users who are given the privilege.

As described above, one or more embodiments of the invention provide a novel methodology of codifying conformance requirements of the hosting service provider in a specification 1000 (FIG. 5), where the requirements are fine-grained, precise rules suitable for automatic checking against a source content (e.g., source server). Generally speaking, the specification 1000 ("spec"), in one or more embodiments, is a set of low level rules that include must-haves and must-not-haves, is automatically checked and is easy to add to or extend. Please note that "must," "must have" and "must not have" terminology is utilized since such terminology is typically used in written specifications for software. However, the use of such terminology herein is not intended to imply that any must have elements are necessarily present in all claimed embodiments, and/or that any must not have elements are necessarily absent in all claimed embodiments. The specification 1000, in some embodiments, includes an indication of the conflicting and/ or incompatible management agents that cannot work with the hosting service provider (e.g., HP management agents are incompatible with an IBM host provider; other IBM software such as ITM, TAD4D, TSCM are also management agents conflicting or incompatible with an IBM host provider); software the source content should have (e.g., a hosting provider should have Cygwin version CYGWIN_NT-6.1-WOW64 1.7.1 (0.218/5/3) to be installed for Windows); security compliance aspects (e.g., password length, expiration policy, etc.; sshd configuration 9 supported protocol versions, root login policy); patching (e.g., patch an OS to the level acceptable by the hosting cloud); an indication of environment compatibility (e.g., for Windows, an administrative account should be "Administrator" and not suspended; %systemroot% should be c:\windows; McAfee Antivirus should not be configured to prevent execution in temp; for Linux, system PATH should include PWD(.) and /etc/hosts must contain information for ip triplets.)

In some embodiments, a conformance checker is provided that automatically checks the specifications against the source content (e.g. source server). In one or more embodiments, when a check fails, the conformance checker can apply a fix to automatically bring the source content into conformance with the spec. For each item that is found non-conforming, an estimate of the level of effort to make the item conform is provided, in some embodiments. In one or more embodiments, a user interface is provided for creating profiles, and specifications (e.g., checks and fixes). In some embodiments, the specs are versioned, as are the profiles and rules.

Figure 5:
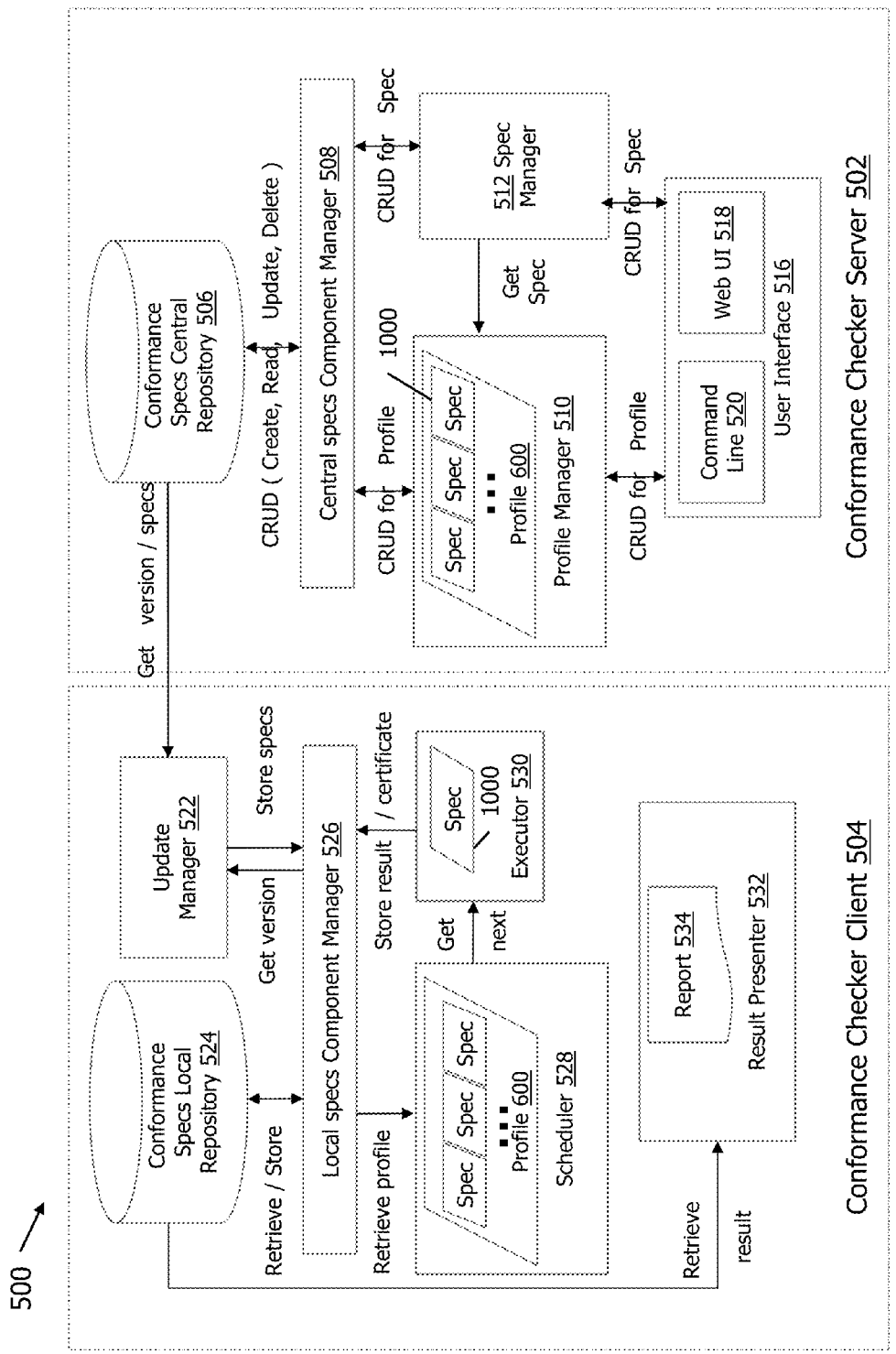
FIG. 5 depicts a model of a conformance checker according to an embodiment of the invention.
Figure 6:
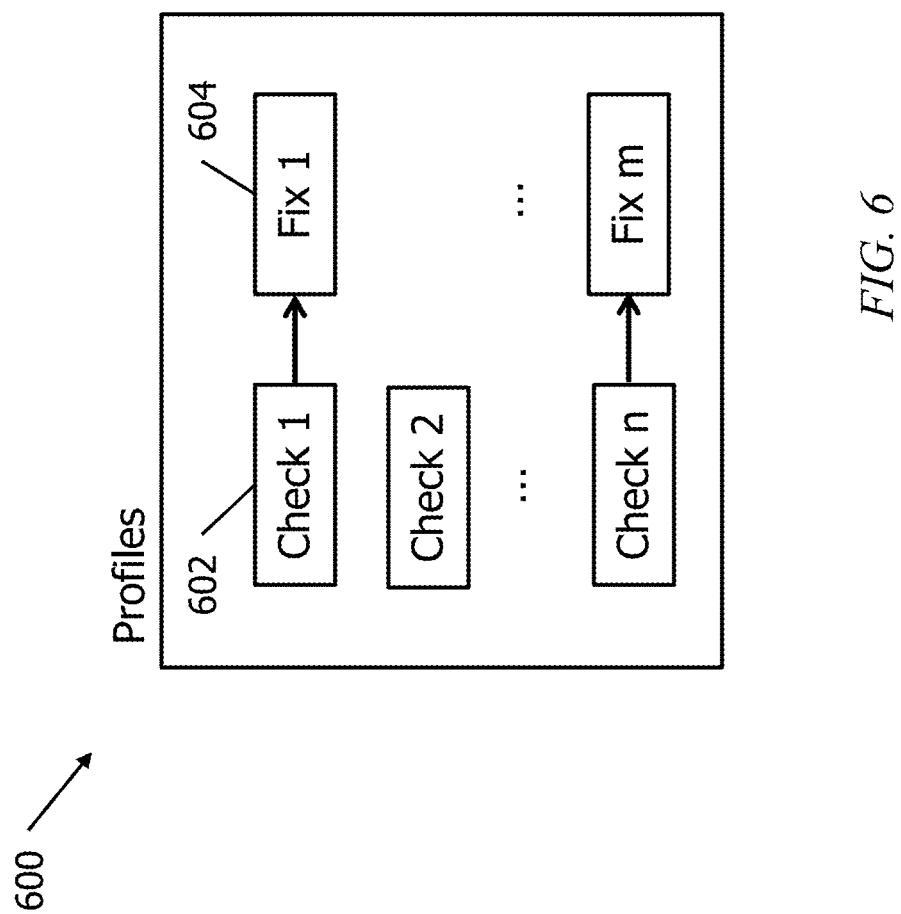
FIG. 6 depicts a model of a profile according to an embodiment of the invention.
Figure 7:
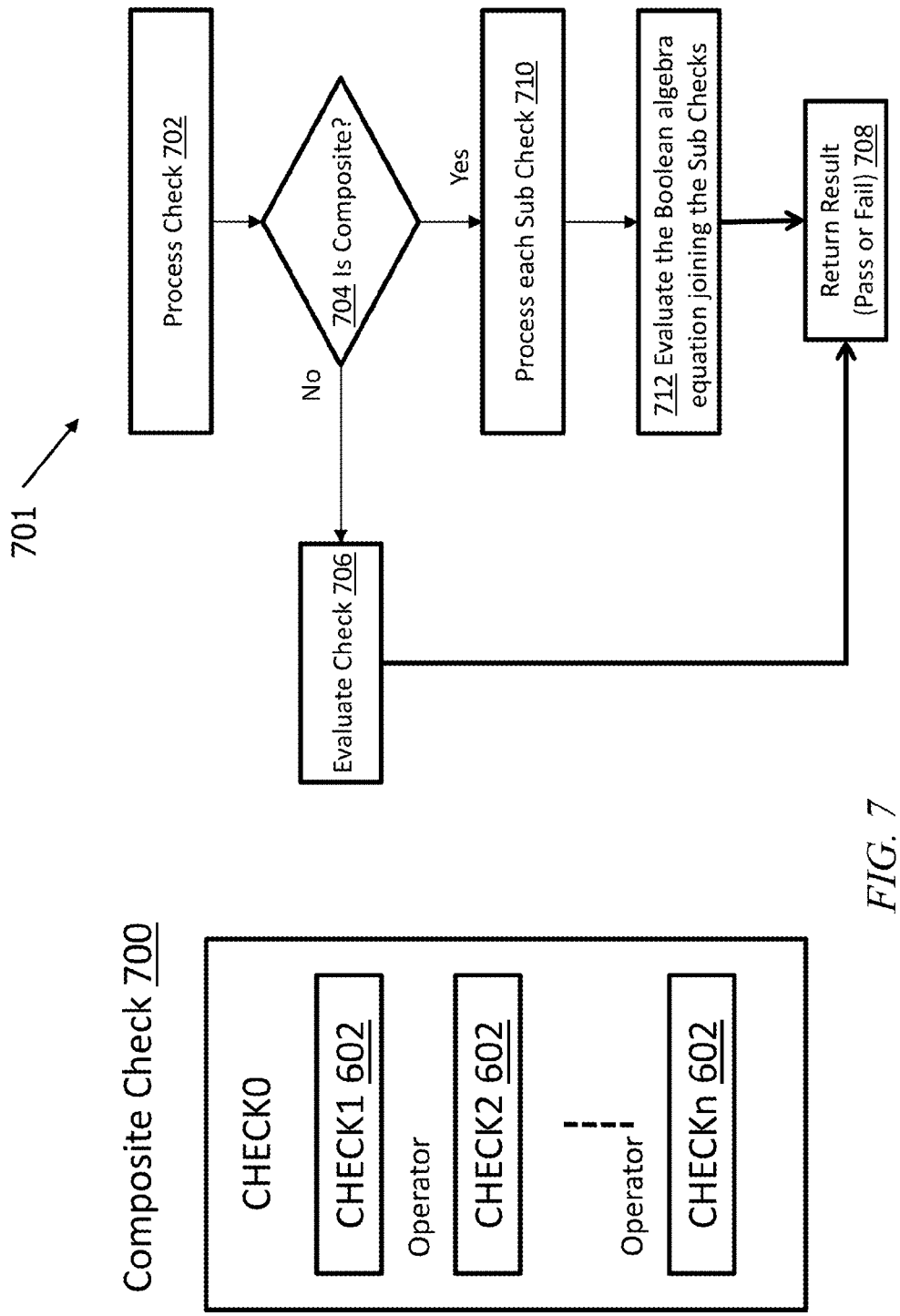
FIG. 7 presents a detailed flow chart and block diagram, according to an embodiment of the invention.
Figure 8A:
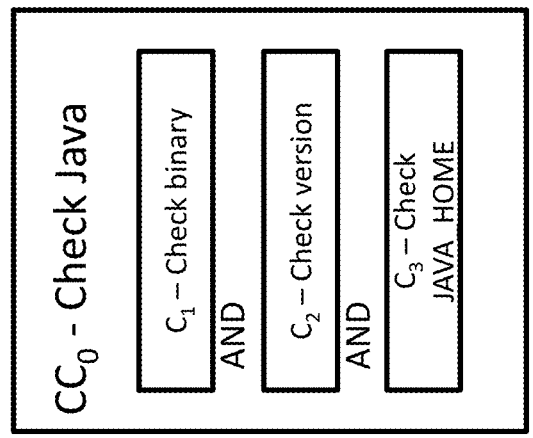
FIGS. 8A-8B present examples of composite checks according to an aspect of the invention.
Figure 8B:
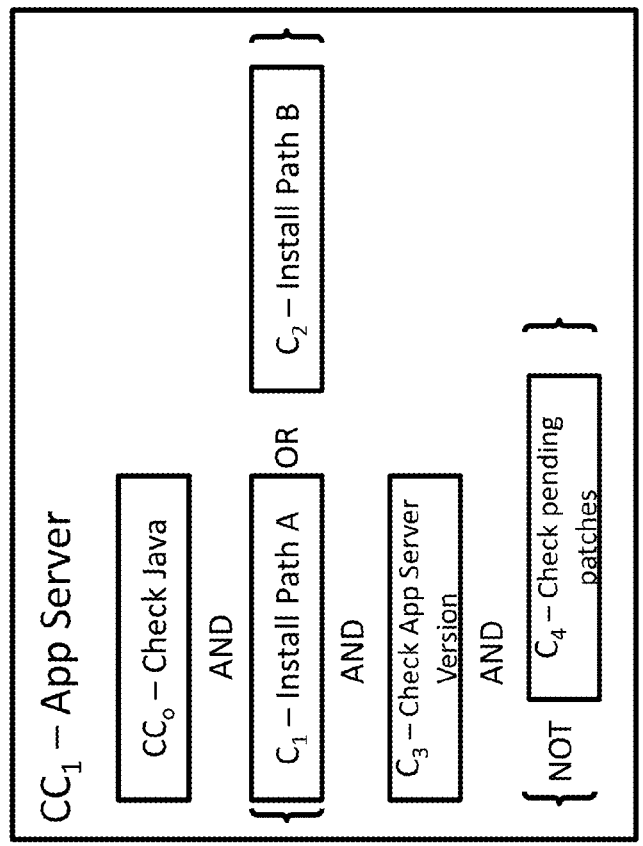

With attention now to FIGS. 5-9D, at least a portion of an exemplary conformance checker 500 is depicted in FIG. 5, an exemplary profile 600 is depicted in FIG. 6, and composite check examples are shown in FIGS. 8A-8B, with an illustrative flow diagram of method steps in corresponding conformance checker methodologies 701, 900A, 900B, 900C and 900D in FIGS. 7 and 9A-9D, respectively, according to one or more embodiments of the invention. The exemplary conformance checker 500 includes a conformance checker server 502 and a conformance checker client 504. Generally, the server side 502 is used to capture and manage the specification; and the client side 504 is used to execute the conformance checking based on the specification 1000. For example, and as described further below, the server side 502 captures one or more requirements of a target hosting environment in a specification, while the client side 504 automatically checks the specification against source content of a source environment, the source content to be migrated to the target hosting environment, with a conformance checker, and determines whether the source content conforms to the specification. The conformance checker server 502 includes a conformance specification ("spec") central repository 506 that stores different versions of the conformance spec 1000 as well as other objects such as profiles. The conformance spec central repository 506 is managed, in some embodiments, by a central spec component manager 508. The central spec component manager 508, in one or more embodiments, Creates, Reads, Updates and Deletes ("CRUD") conformance specs 1000 from the conformance spec central repository 506, as needed. The conformance checker server 502 also includes one or more profiles 600, described further below, and a profile manager 510 which manages the one or more profiles 600. In some embodiments, the profile manager 510 communicates with the central specs component manager 508 to manage the CRUD aspects of the one or more profiles 600.

A profile 600 represents a set of conformance rules pertaining to a specific target or host environment of the hosing source provider. In other words, the spec 1000 includes one or more profiles 600. In one or more embodiments, the source content needs to comply with the conformance rules prior to migration to the host environment. Low-level checking of the source content is carried out by including a piece of executable code as an attribute in the checker 500 that checks for the specific conformance rule. Generally, in one or more embodiments, the rules are sufficiently flexible to support arbitrary conditions, such as must-haves and must-not-haves; rule objects are machine parse-able and can be automatically executed by the checker 500; and the rules are easy to add to or extend (e.g. adding a rule can be done by creating a new rule object and associating it with an executable that implements the checking logic.)

In some embodiments, there are two types of rules that make up the specification 1000, check rules ("checks") 602 and fix rules ("fixes") 604. In some embodiments, a check refers to a specification of the check rules whereas a fix refers to a specification of the fix rules. Other types of rules may be used. In some embodiments a check 602 includes meta-data describing the check, an executable, and a remediation action. An executable is logic that implements the check (e.g., scripts, or Java classes, etc.). A remediation action is an action that is invoked upon the passing or failing of the check. In some embodiments, a remediation action can be a description or a link to a fix, where the fix here refers to another specification that is of the fix rule type. In some embodiments, the fix rule 604 is the same as the check rule 602, except that it does not have a remediation action. In other words, a fix rule 604 includes meta-data describing the fix rule, and an executable (logic that implements the fix rule) (e.g., scripts or java classes, etc.).

An example of a check 602 is one that checks if the operating system (OS) level of the source content system is above a certain level (e.g., 6.1.6). The check executable is a script called "OSLevelCheck.ksh", and this check does not have an automatic fix. It is estimated that the effort to fix the system in order to pass the check (e.g., upgrade to the required level) is 5 days. In one or more embodiments, the check may read as follows:

```
{
  "checkType": "Custom",
  "OS": "AIX",
  "description": "Checks if the OS level of the system is above the required level",
  "execEnv": "ksh",
  "numArgs": "3",
  "args": [
    "6",
    "1",
    "6"
  ],
  "checkScriptFile" : "OSLevelCheck.ksh",
  "failAction": "OSLevelCheck failed, need to upgrade the OS",
  "effort": "5 days"
}
```

Each profile 600 includes a list of specifications that can be checks or fixes.

In some embodiments, specifications are based on templates called rule templates, where rule templates are abstract rules that define some parameters without actually specifying the values of these parameters. In terms of comparison to object oriented programming, rule templates may be thought of as "classes." Specifications such as checks and fixes are instances of rules that have the values of the parameters filled in. In terms of comparison to object oriented programming, specifications may be thought of as "instances" of classes. In one or more embodiments, each rule template contained in the profile 600 needs to be instantiated, or made concrete by filling in the parameters, before the checks can be executed. In one or more embodiments a specification, e.g., check or fix, is created by retrieving a rule template and filling in values of the parameters defined by the rule template.

In keeping with the example of the check above, an example of a Rule template is:

```
{
  "checkType": "Custom",
  "OS": "AIX",
  "execEnv": "ksh",
  "numArgs": "3",
  "args": [
    ?,
    ?,
    ?
  ],
  "checkScriptFile": "OSLevelCheck.ksh",
  "failAction": "OSLevelCheck failed, need to upgrade the OS",
  "effort": "5 days"
}
```

In keeping with the example of the check above, an example of a specification based on the above rule template is:

```
{
  "checkType": "Custom",
  "OS": "AIX",
  "execEnv": "ksh",
  "numArgs": "3",
  "args": [
    6,
    1,
    6
  ],
  "checkScriptFile": "OSLevelCheck.ksh",
  "failAction": "OSLevelCheck failed, need to upgrade the OS",
  "effort": "5 days"
}
```

In one or more embodiments, two or more individual checks 602 are grouped into a higher level logical check, called a composite check 700. As will be further described below, in some embodiments, the group of checks contained in the composite check is joined with Boolean algebra. The composite check 700 includes one or more sub checks 602 which can themselves be composite checks. The composite check 700 captures the pass/fail of a source system or source logical component. In other words, the composite check 700, in some embodiments, captures the overall pass/fail of the sub-checks. Additionally, in some embodiments, when individual checks 602 are being grouped, dependency requirements are captured within the composite checks 700 (e.g., if product A is not installed then do not check the version of product A).

In one or more embodiments, a check is processed in step 702. In step 704 it is determined whether the check is a composite check 700. If the check is not composite, the check is evaluated in step 706, and a result of pass or fail is returned in step 708. Other results may be returned. On the other hand, if in step 704 it is determined the check is a composite check, in step 710, each sub check is processed. In some embodiments, the composite check returns an overall check result based on standard Boolean algebra (AND, OR, NOT) joining sub checks. Other methods may be used to join the sub checks. In step 712, the Boolean algebra equation joining the sub checks is evaluated. In some embodiments, the Boolean algebra evaluation is applied on composite checks. If the sub-check is itself a composite check, then the Boolean algebra evaluation applies too. After evaluation of the composite check, the process proceeds to step 708 for the return of a result of pass or fail. In other words, in some embodiments, the result of the evaluation of a composite check 700 would be either a "Pass" or a "Fail." Some of the advantages to using composite checks are that they simplify the user's understanding of the check results (higher-level constructs) by just providing a single result; and they simplify the user's management of profiles (reuse, higher-level constructs). As used herein, reuse means that a check (or fix) can be used by more than one composite check as a sub-check; and/or the check (or fix) can also be used by more than one profile (e.g., it is reused multiple times).

Some examples of standard Boolean operators are AND (&&), OR (||) and NOT (!). As a further example, for the operation "a&&b," if elements a and b are both Pass, evaluate the composite check as Pass. If elements a or b are Fail, evaluate the composite check as Fail. For the operation a||b, if element a or b is Pass, evaluate the composite check as Pass. If element a and b are Fail, evaluate the composite check as Fail. For the operation !a, if element a is Pass, evaluate the composite check as Fail. If element a is Fail, evaluate the composite check as Pass.

FIGS. 8A and 8B provide additional examples of composite checks. In these figures, the notation "C" denotes a check 602, while "CC" denotes a composite check 700. In FIG. 8A, the sample check has three sub checks ($C_1$, $C_2$ and $C_3$). The purpose of this check is to validate that the Java "system" meets the host environment specification. In FIG. 8B, the sample check has four sub checks ($CC_0$, $C_1$ or $C_2$, $C_3$ and $C_4$), two of which are composite checks ($CC_0$ and $C_1$ or $C_2$). The purpose of this check is to validate that the App Server "system" meets the host environment specification. The "Java" system is a subcomponent/requirement of the App Server system.

As described above with respect to FIG. 5, the conformance checker 500 includes the conformance checker server 502 and the conformance checker client 504. Referring to the conformance checker server 502, the Conformance Specs Central Repository 506 stores the conformance checker components, e.g., specifications and profiles. The Central Specs Component Manager 508 provides the interface to access the conformance checker components with the CRUD (Create, Read, Update, and Delete) functions. The Spec Manager 512 provides the CRUD functions for accessing specifications and facilitates the composition of specs. The Profile Manager 510 provides the CRUD functions for the profile objects. A profile contains a list of specifications. The Profile Manager 510 calls the Spec Manager 512 to retrieve and validate specs which are to be put into the spec list for a profile, which includes a list of specifications.

In one or more embodiments, the conformance checker server 502 includes a user interface 516. The user interface 516 includes, in one or more embodiments, a web user interface (UI) 518 and a command line UI 520. In some embodiments a user communicates with the profile manager 510 and Spec manager 512 through the user interface 516 to Create, Read, Update and Delete profiles and specifications, respectively.

In some embodiments, an update manager 522 of the conformance checker client 504 polls the conformance spec central repository 506 for new versions of the specs 1000. The conformance checker client 504 includes, in some embodiments, a conformance specs local repository 524 for storing specs 1000 that the client has previously downloaded to use to test the source content against. The conformance specs local repository 524 also stores other data and/or reports in one or more embodiments. The conformance checker client 504 also includes, in some embodiments, a local specs component manager 526. In one or more embodiments, the local specs component manager 526 communicates with the conformance specs local repository 524 to retrieve/store local specs 1000. In some embodiments, the local specs component manager 526 communicates with the update manager 522 to retrieve a particular version of the spec 1000 from the conformance checker server 502. In one or more embodiments, the update manager 522 retrieves the most up-to-date version of the spec 1000 from the conformance checker server 502.

In some embodiments, the conformance checker client 504 also includes a scheduler 528 and an executor 530. The scheduler 528 includes a profile 600, in one or more embodiments. In one or more embodiments, the scheduler 528 retrieves the profile 600 from the local specs component manager 526 and schedules the conformance check. The executor 530 receives one specification at a time based on the order determined by the scheduler 528, and executes the executable script code of this specification. The executor 530 sends the results of the conformance check to the local specs component manager 526. In some embodiments the executor 530 sends a certificate indicating the source content has passed the conformance check to the local specs component manager 526.

The conformance checker client 504 also includes a result presenter 532. After the executor 530 has executed the conformance check, the local specs component manager 526, in one or more embodiments, sends the results/certificate to the conformance specs local repository 524. The result presenter 532 then retrieves the results and/or certificate from the conformance specs local repository 524 and presents same in the form of a report 534.

Figure 9A:
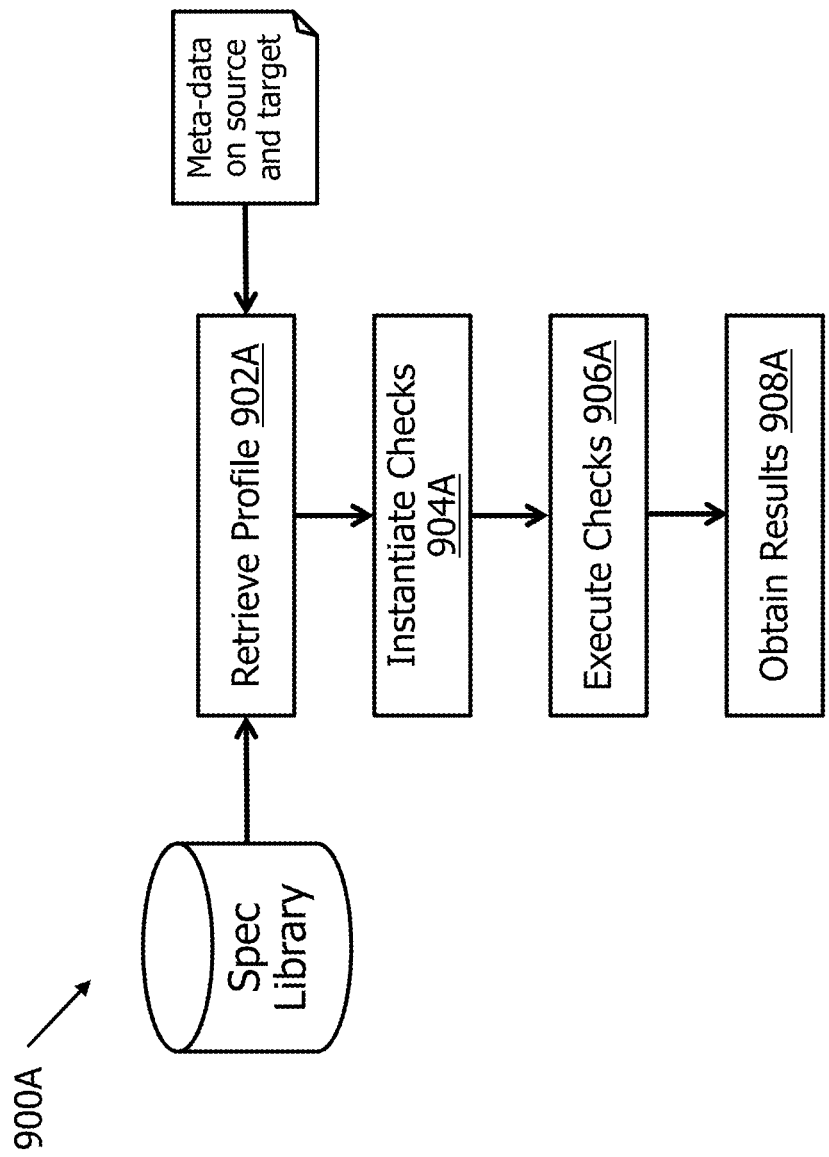
FIGS. 9A-9D present detailed flow charts according to aspects of the invention.

In operation, a general flow diagram 900A for the conformance checker 500 is provided in FIG. 9A. The conformance checker 500 retrieves a profile 600 of a spec 1000 from a spec library, and meta-data from the source content in step 902A. Then the conformance checker 500 instantiates the checks in step 904A. In step 906A, the conformance checker 500 executes the checks. Then in step 908A, the conformance checker 500 obtains results.

Figure 9B:
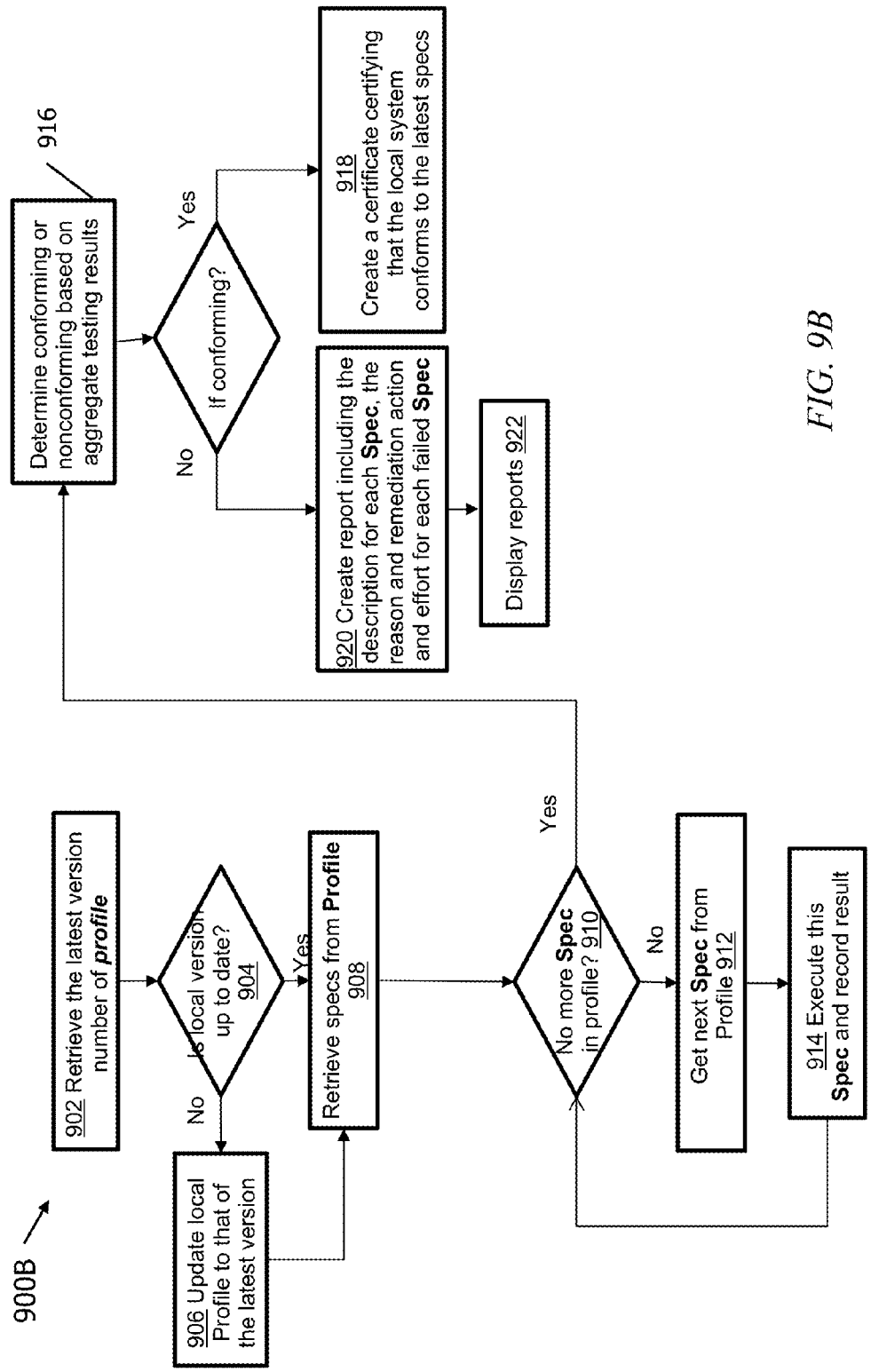

More particularly, the conformance checker 500 applies the method 900B of FIG. 9B to determine whether a source content conforms to the spec 1000. In step 902 the conformance checker 500 retrieves the latest version number of conformance specs 1000 from the conformance spec central repository 506, as the specs may change through time. The unit of retrieval of specs can be a profile which contains a group of specifications. Thus a version number is associated with each profile. The conformance checker 500 determines whether the local version of the spec 1000 is up to date in step 904 by comparing the latest version, retrieved in step 902, with the version of the same local profile that was last retrieved. If the local version of the profile 600 is not up to date, the local profile 600 is updated to the latest version in step 906 and stored in the conformance specs local repository 524. After the local profile 600 is the latest version (i.e., was the latest version ab initio, or has been updated to the latest version), the method 900 proceeds to step 908 which retrieves the specs from the profile. Next, it is determined in step 910 if there are more specs in the profile. If there are more specs in the profile, each spec is retrieved in step 912, one by one, and executed in 914 with results recorded, until all specs have been executed 914. The method 900 repeats steps 910-914, until the conformance checker 500 determines, in step 910, that there are no other specs in the profile 600. The method 900 then proceeds to step 916 where it is determined whether the source content is conforming or nonconforming. The conformance checker 500 determines whether the source content is conforming or nonconforming based on aggregate testing results. If the source content conforms to the spec 1000, a certificate certifying that the source content (and in some embodiments the local system) conforms to the latest profile 600 is created by the conformance checker 500 in step 918. If the source content does not conform to the spec 1000, the conformance checker 500 creates a report including the description for each check, and the reason, remediation action and effort for each failed check in step 920 and displays the reports in step 922.

Figure 9C:
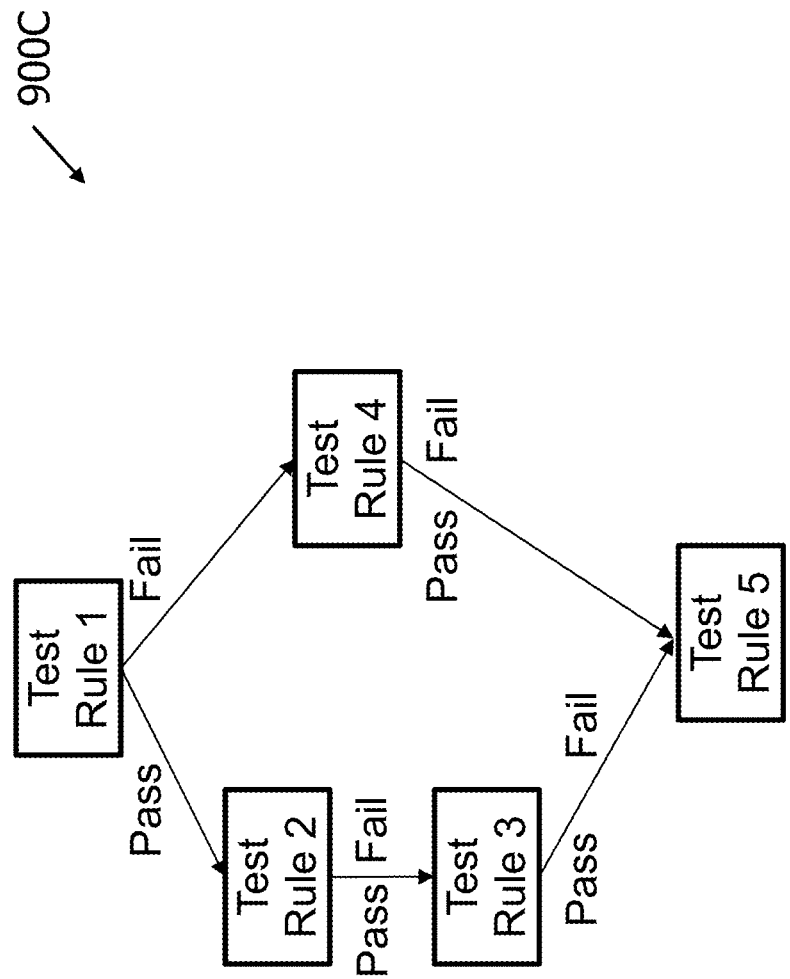
Figure 9D:
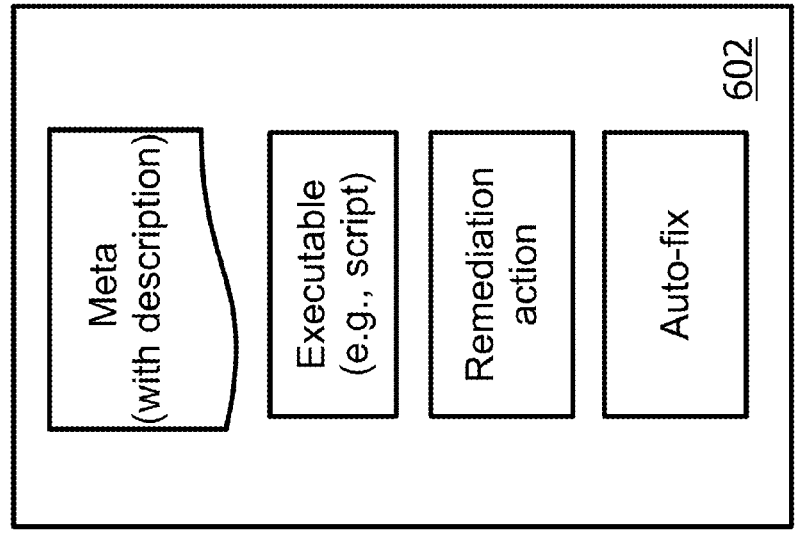
Figure 9D:
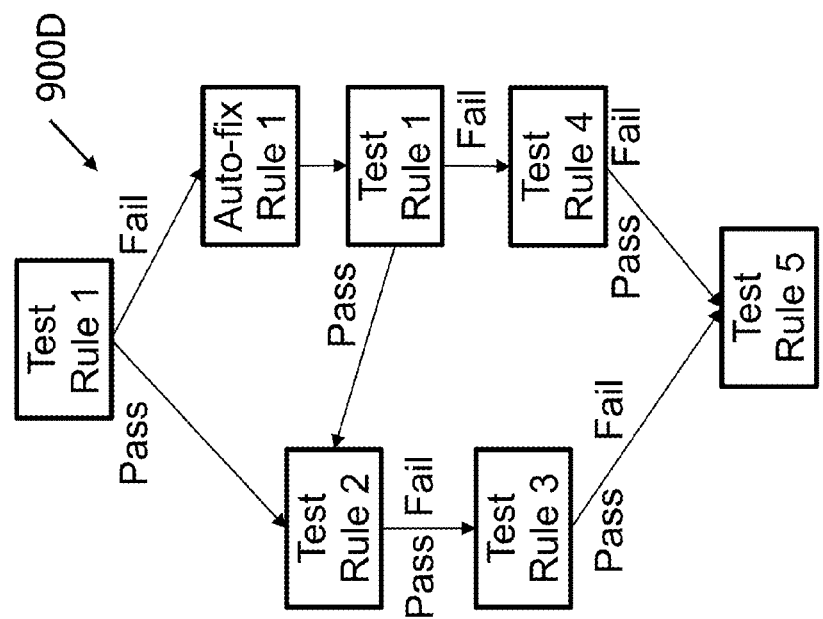

Turning to FIG. 9C, an exemplary flow diagram is provided according to one or more embodiments of the invention. In one or more embodiments, an implementation of conformance specs 1000 includes the latest version of the spec, as specs may change over time. The spec 1000 includes one or more tests for each rule in the spec to determine if the source content (e.g., local system) conforms to a particular rule. The outcome of whether the source content passes or fails the test determines which test is next applied to the source content.

As described above, when the source content fails one of the tests or checks, the conformance checker 500 may automatically apply a fix to have the source content pass the test and comply with the spec 1000. An exemplary flow diagram and exemplary rule 602 are provided in FIG. 9D according to one or more embodiments of the invention.

It will accordingly be appreciated that one or more embodiments provide a method including capturing one or more requirements of a target hosting environment in a specification; automatically checking the specification against a source content of a source environment, the source content to be migrated to the target hosting environment, with a conformance checker; and determining whether the source content conforms to the specification. This method can be carried out, for example, with the particular machine shown in FIG. 5 as described above, implemented in software running on one or more hardware processors. Corresponding apparatuses and computer program products are also provided.

Figure 10:
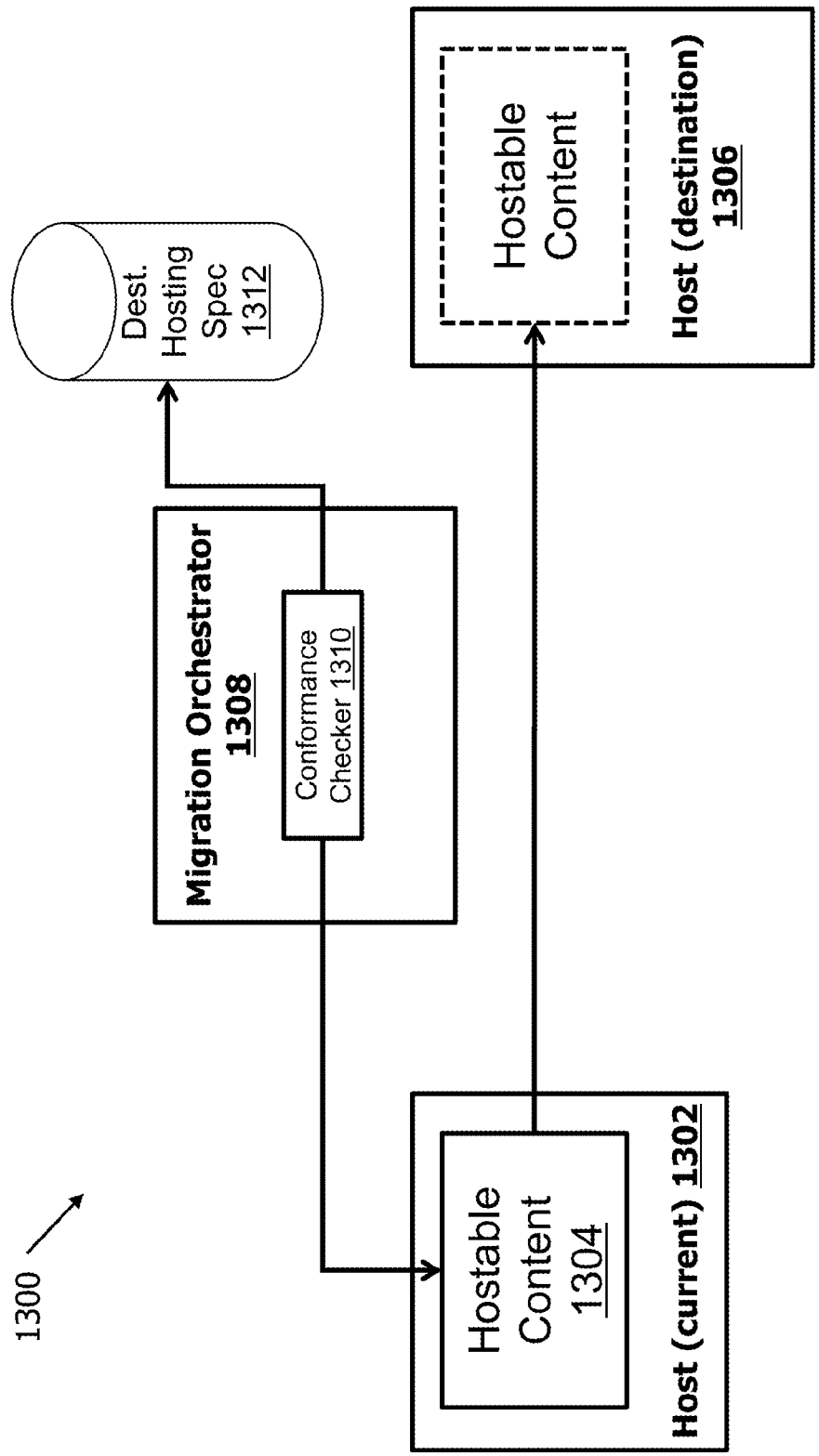
FIG. 10 depicts a block diagram of architecture according to an embodiment of the present invention.

With attention now to FIG. 10, for spec-guided migration, one or more embodiments of the invention include migration architecture 1300. The migration architecture 1300 includes a current or source host 1302. A host is an entity that can host hostable/source content 1304, where hostable content is content which can be hosted. Some examples of hosts are a server, a laptop, and a mobile phone. Other suitable hosts may be used. Some examples of hostable content are files, virtual machines, etc. Other suitable hostable content may be used. The architecture 1300 also includes a destination host 1306. The destination host 1306 or hosting service provider (e.g. a managed infrastructure as a cloud) imposes a set of requirements on the source hostable contents/entity that are hosted. The architecture 1300 includes a migration orchestrator 1308 to facilitate the migration of the source content 1304 from the source host 1302 to the destination host 1306. In one or more embodiments, the migration orchestrator 1308 includes a conformance checker 1310 that when executed checks a destination host spec ("spec") 1312 against the source content 1304 to determine whether the source content 1304 is conformant with the spec 1312. The spec 1312 and conformance checker 1310 described herein can include all of the features of spec 1000 and conformance checker 500 described above and vice versa.

Figure 11:
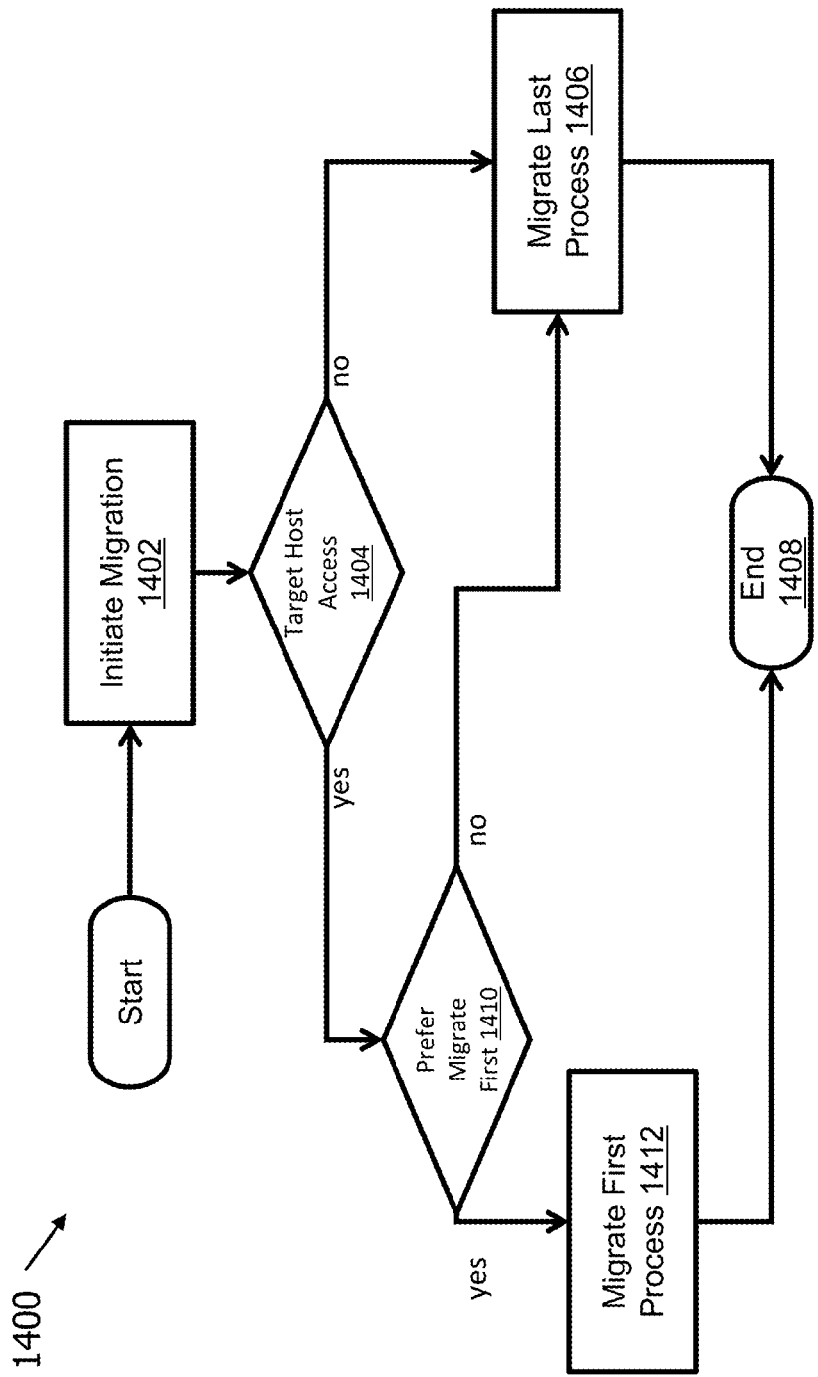
FIG. 11 presents a detailed flow chart, according to an aspect of the invention.
Figure 12:
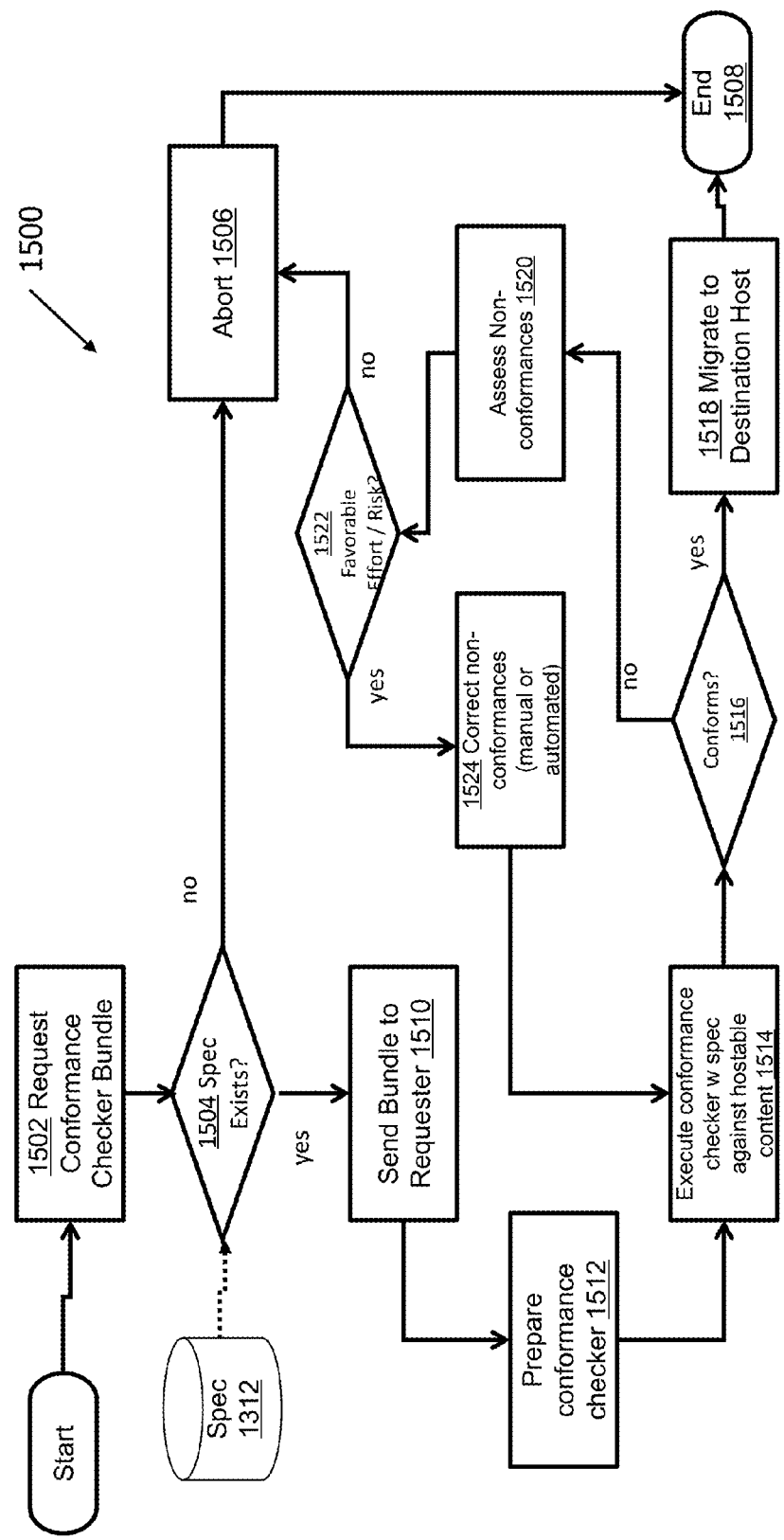
FIG. 12 presents a detailed flow chart, according to an aspect of the invention.
Figure 13:
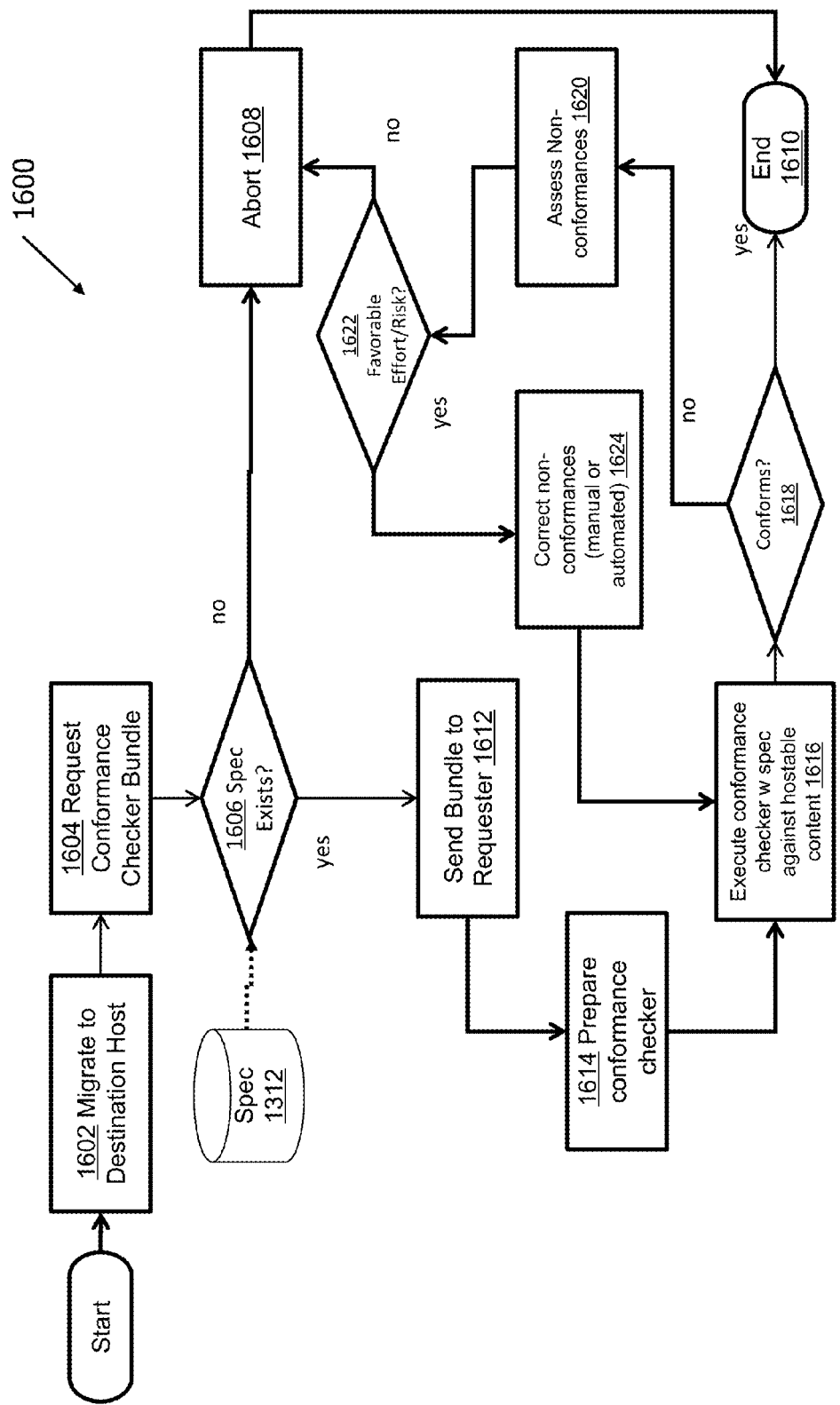
FIG. 13 presents a detailed flow chart, according to an aspect of the invention.

Turning now to FIGS. 11, 12 and 13, methodologies of the overall migration process, migration after conformance, and migration before conformance are depicted in flow diagrams 1400, 1500 and 1600, respectively, according to one or more embodiments of the invention. In step 1402, the migration process begins. Then in step 1404, it is determined whether the target or destination host 1306 access is provided to correct non-conformances. If there is no destination host 1306 access, the method 1400 proceeds to a Migrate Last process in step 1406, as described further below with respect to FIG. 12. In determining whether the destination host 1306 has access or not, it is determined whether the destination host 1306 supports the ability to correct or remediate non-conformances of the source content 1304 after the source content 1304 has been migrated to the destination host 1306. If the destination host 1306 does not support remediation, non-conformances are corrected before the migration occurs in what is referred to herein as a Migrate Last process. The method 1400 ends at step 1408.

If in step 1404 there is destination host 1306 access, the method 1400 proceeds to step 1410 where it is determined whether a user prefers to migrate first, before non-conformances are corrected, in a Migrate First process. At this point, the migration can either use a Migrate First or a Migrate Last process. In one or more embodiments, the choice of using a Migrate First process versus a Migrate Last process depends on migration needs (e.g., for more security, migrate last, and for a faster time to the host, migrate first). If the user does not prefer to Migrate First, the method 1400 proceeds to step 1406, and the Migrate Last process is executed. If in step 1410, the user prefers to Migrate First, the process 1400 proceeds to step 1412, and the Migrate First process is executed, as described further below with respect to FIG. 13. The method 1400 ends at step 1408.

A Migrate Last process 1500 is described in FIG. 12 according to some embodiments of the invention. In this process 1500, migration of hostable content 1304 is performed as the final step of the process. In one or more embodiments, a Migrate Last process is used when moving to a destination host 1306 which does not provide access to correct non-conformances. In step 1502, a conformance checker bundle is requested. In one or more embodiments, the source host 1302 requests the conformance checker bundle from the migration orchestrator 1308, and it is downloaded directly into the source host 1302. In other words, the source system downloads the conformance checker. Alternatively, the requester is a person and downloads the bundle to his or her local system. In some embodiments the conformance checker bundle includes the conformance checker 1310 and the spec 1312. In some embodiments, the conformance checker 1310 and the spec 1312 are requested independently. Both the conformance checker and the spec are available at the time of conformance checking. In step 1504 it is determined whether the spec 1312 exists. If the spec 1312 does not exist, the method 1500 proceeds to step 1506, where the process is aborted, and then the process ends in step 1508.

If in step 1504 it is determined the spec 1312 does exist, the spec 1312 is retrieved from a spec repository, and the bundle is sent to the requester in step 1510. In step 1512, the conformance checker 1310 is prepared. In some embodiments, preparing the conformance checker includes unpackaging the bundle, and moving the executable to an appropriate area. The conformance checker 1310 is executed with the spec 1312 against the source content 1304 in step 1514. In one or more embodiments, the source system runs the conformance checker. In one or more embodiments, a human operator invokes the conformance checker on the source content. A determination is made in step 1516 whether the source content 1304 conforms to the spec 1312. If the source content 1304 conforms to the spec 1312, the method 1500 proceeds to step 1518 where the source content 1304 is migrated to the destination host 1306. In some embodiments, the migration orchestrator or other known migration technique is used. In some embodiments, the hostable content is migrated to the destination host over a network for transporting physical media. The method 1500 then ends in step 1508. If the source content 1304 does not conform to the spec 1312, the method 1500 proceeds to step 1520, and an assessment of the non-conformances is made. In one or more embodiments, this assessment is performed by a user. In assessing the non-conformances, a determination is made in step 1522 whether the effort/risks associated with correcting the non-conformances are favorable. If it is determined in step 1522 the effort/risk is not favorable, the method 1500 proceeds to step 1506, where the method 1500 is aborted, and then the process ends in step 1508. If it is determined in step 1522 the effort/risk is favorable the method 1500 proceeds to step 1524 where the non-conformances are corrected. As described above, in one or more embodiments, the correction or remediation of the non-conformances is done automatically (e.g., with a fix by the conformance checker) or manually. After the non-conformances are corrected, the method 1500 proceeds back to step 1514, described above. The process 1500 is iteratively performed until the source content 1304 conforms to the spec 1312 and is migrated or the process is aborted.

As described above with respect to step 1522, a determination is made whether the effort/risks associated with correcting the non-conformances are favorable. In some embodiments, each item that does not conform (each non-conformance) has one or more aspects and a magnitude for each aspect which influences its favor for migration. Some examples include, a technical possibility aspect, with a "true" or "false" magnitude, as some things might be technically impossible (e.g., can't migrate a SPARC native app to AIX); a risk aspect, with a "high", "medium" or "low" magnitude, (e.g., risk to break application functionality, security posture, support procedures); a labor aspect, with a "days" and "hours" magnitude related to the labor to correct the non-conformance; a cost aspect related to a new software license incurred, outside contractor support; a degree of change aspect, with a "high", "medium" or "low" magnitude, related to how big of a change would it be to correct the non-conformance (e.g., an OS change is high, a single configuration setting is low). Other suitable examples may apply. In one or more embodiments, the aspects are evaluated individually (e.g., the aspect might constitute an abortion/abandonment on its own), as well as in aggregate (the overall sum or interactions of the aspects may favor abortion/abandonment). In some embodiments, after the conformance checker has been executed, the favorableness analysis/evaluation is performed to decide if the migration is favorable within the specific context of the scenario. For example, there may be a very high motivation to move a hostable content 1304 to a new host destination 1306, regardless of the costs, and therefore even very unfavorable aspects would still result in migration. As another example, in a scenario where the user is looking to save operational costs, if the labor required to correct non-conformances results in an unsatisfactory payback period for the migration, the migration would be aborted.

A Migrate First process 1600 is described in FIG. 13 according to some embodiments of the invention. In this process 1600, migration of the source content 1304 is performed as the first step. In some embodiments a Migrate First process is used when the source content 1304 is moved to a destination host 1306 which provides access to correct non-conformances. In step 1602, the source content 1304 is migrated from the source host 1302 to the destination host 1306. In step 1604, the destination host 1306 requests the conformance checker bundle from the migration orchestrator 1308. In step 1606 it is determined whether the spec 1312 exists. If the spec 1312 does not exist, the method 1600 proceeds to step 1608, where the process is aborted, and then the process ends in step 1610. If in step 1606 it is determined the spec 1312 does exist, the spec 1312 is retrieved from a spec repository, and the bundle is sent to the requester in step 1612. In step 1614, the conformance checker 1310 is prepared, as described above. The conformance checker 1310 is executed with the spec 1312 against the source content 1304 in step 1616. A determination is made in step 1618 whether the source content 1304 conforms to the spec 1312. If the source content 1304 conforms to the spec 1312, the method 1600 ends in step 1610. If the source content 1304 does not conform to the spec 1312, the method 1600 proceeds to step 1620, and an assessment of the non-conformances is made. In assessing the non-conformances, a determination is made in step 1622 whether the effort/risks associated with correcting the non-conformances are favorable. If it is determined in step 1622 the effort/risk is not favorable, the method 1600 proceeds to step 1608, where the method 1600 is aborted, and then the process ends in step 1610. If it is determined in step 1622 the effort/risk is favorable, the method 1600 proceeds to step 1624 where the non-conformances are corrected. As described above, in one or more embodiments, the correction or remediation of the non-conformances is done automatically (e.g., with a fix by the conformance checker) or manually. After the non-conformances are corrected, the method 1600 proceeds back to step 1616, described above. The process 1600 is iteratively performed until the source content 1304 conforms to the spec 1312 or the process is aborted.

As described above, cost is a consideration associated with migrations. The cost of a migration is comprised of many dimensions including As previously mentioned there are many dimensions to the cost associated with migrations (i.e. risk, labor, downtime) that are reduced or eliminated due to the predictability generated as a result of this invention. The following example demonstrates how the costs are reduced and eliminated.

It is a fairly common Cloud model that local storage for cloud instances are ephemeral and do not persist across instances launches. This means that if an application is configured to store data locally that it will be lost if the underlying instance is restarted or terminates. The IBM BlueMix PaaS Cloud is an example of this model. In a legacy environment it is possible that the application relied on access to local storage to persist application related data (file uploads, databases, batch processing records, and the like). In the scenario where a user performed a non-spec guided migration it is possible that their application would continue to assume that local storage is permanent and reliable. When their instance terminates and restarts they will find that their application is not behaving as expected. Only after investigation and debugging would it become clear that the root cause of the issue is the ephemeral disk and the incorrect assumption within the application. At this point the application would need to be reconfigured or new development performed to conform the application to the target cloud specification. This is in addition to the application data which would be permanently lost.

In this example, the lost work due to failed migration would have been minimized, according to some embodiments of the invention, by using a conformance checker because the conformance checker prevents unnecessary failures by making sure the source content conforms prior to migration.

Figure 14:
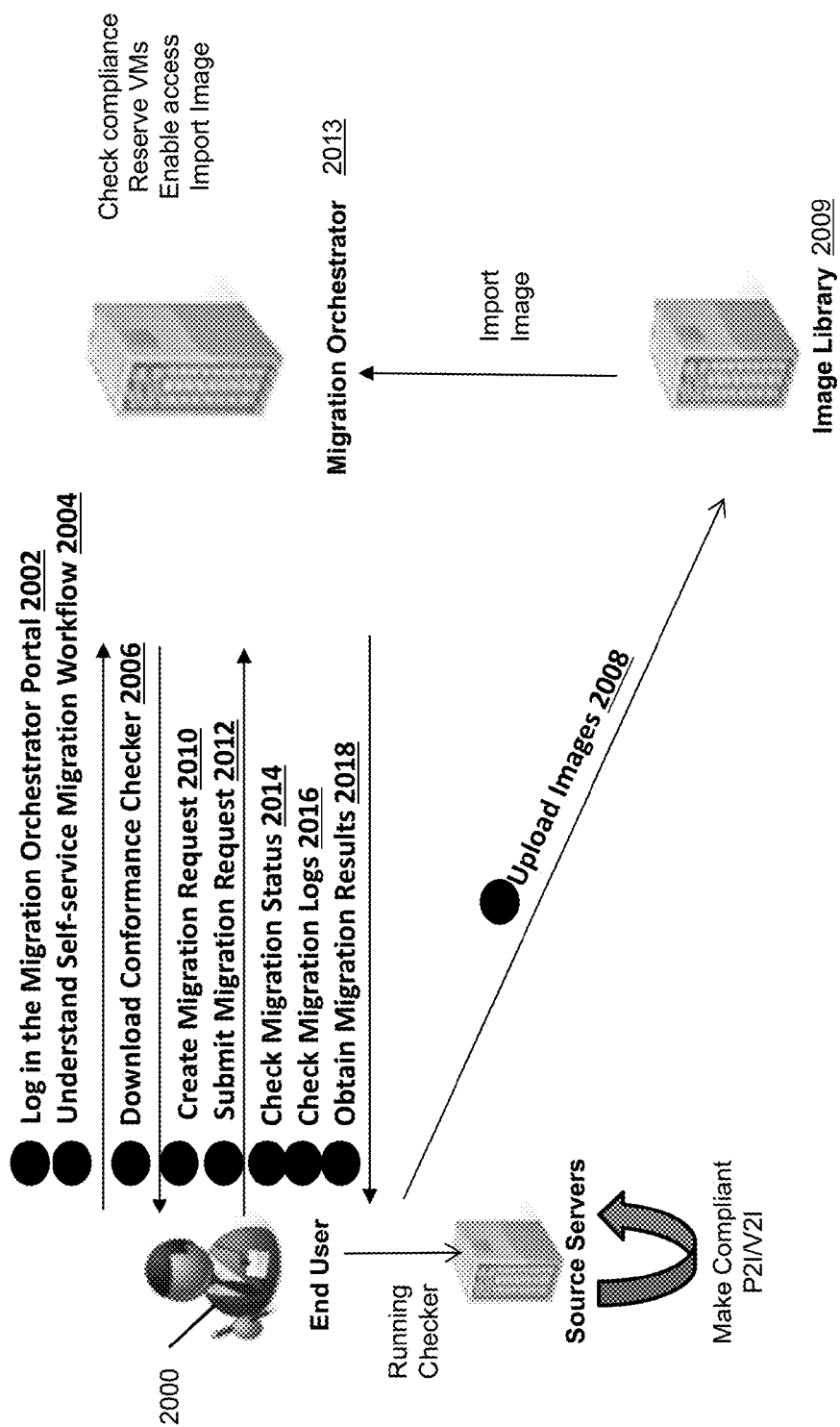
FIG. 14 presents a detailed flow and component diagram, according to an aspect of the invention.
Figure 15:
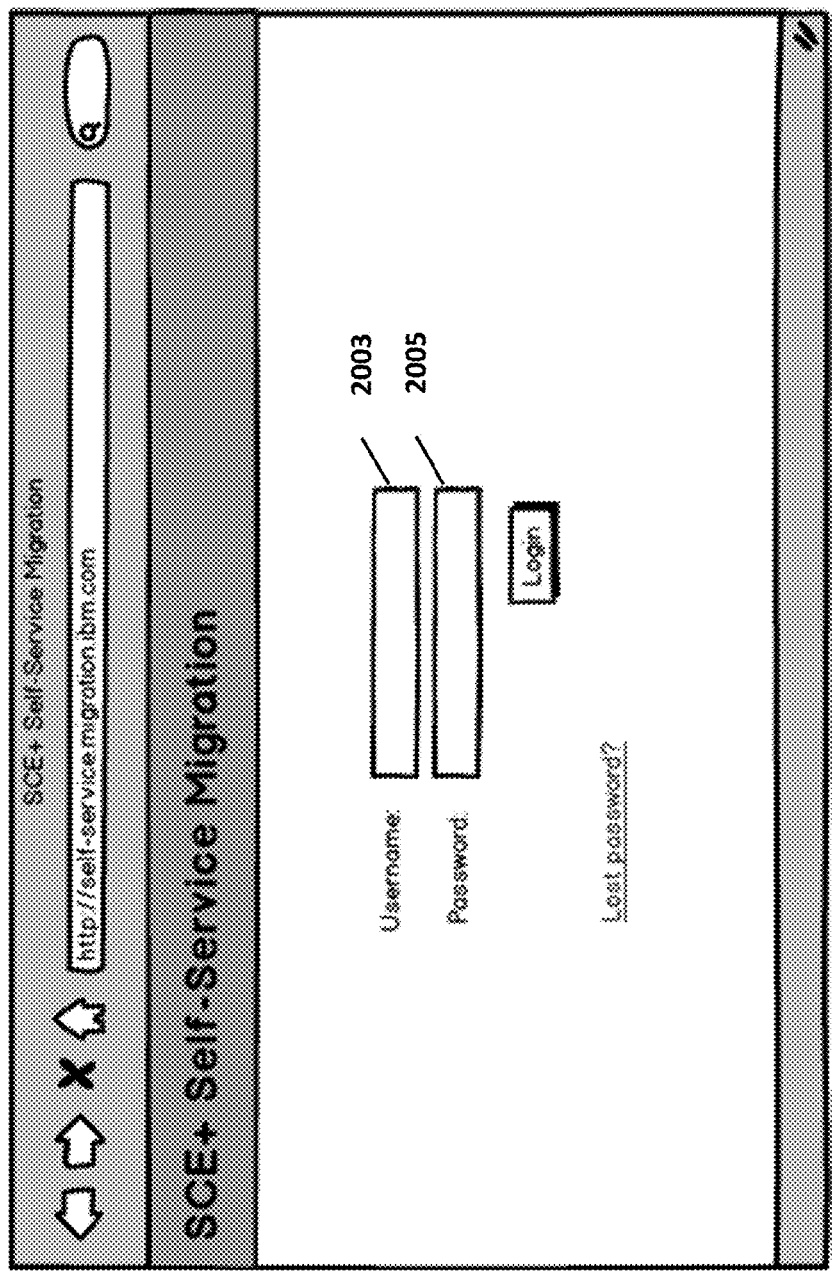
FIG. 15 presents a computer screen display associated with the flow chart of FIG. 14, according to an aspect of the invention.
Figure 15:
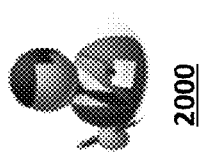
Figure 16:
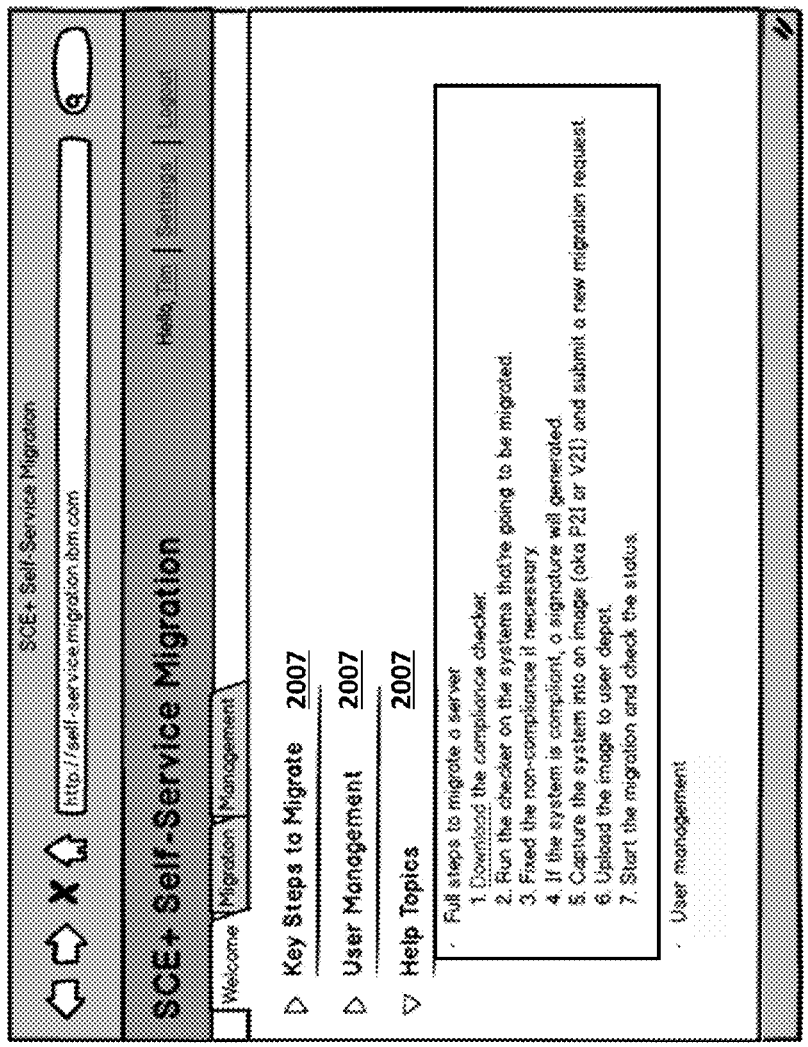
FIG. 16 presents a computer screen display associated with the flow chart of FIG. 14, according to an aspect of the invention.
Figure 16:
Figure 17:
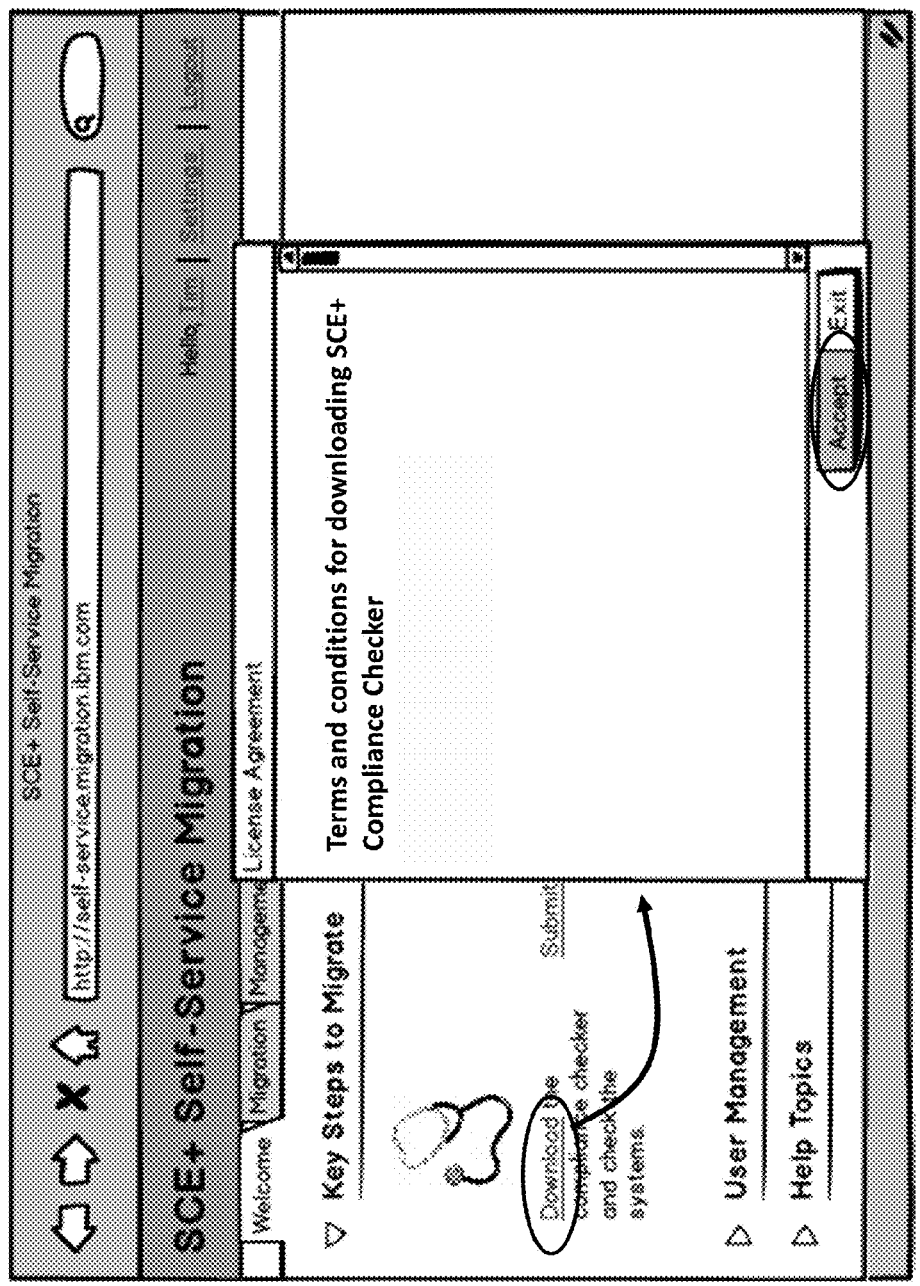
FIG. 17 presents a computer screen display associated with the flow chart of FIG. 14, according to an aspect of the invention.
Figure 17:
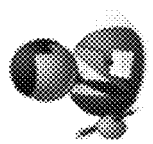

Turning to FIG. 14, a flow and component diagram of an example of self service migration to a cloud (e.g., E+) with Image Migration using the "migrate last" method is provided according to some embodiments. The claims are not restricted to this example. FIGS. 15-23 provide examples of computer screen displays associated with the migration shown in FIG. 14 and used by a user 2000 to go through the migration process, according to some embodiments. As a first step in self service migration, the user 2000 logs into the migration orchestrator portal in step 2002. In some embodiments, the user 2000 logs in to the system by providing a user name 2003 and password 2005 (FIG. 15). Then in step 2004, the user 2000 understands the self-service migration workflow by reading one or more guidance documents 2007 provided by the portal (FIG. 16). For example, the guidance documents may describe key steps to migration, which show the key steps including downloading a checker, submitting a request and viewing the status of the migration. Another example of a guidance document may describe user management, which shows the tasks of user management, including add/delete a user, set password, and set roles. Another example of a guidance document may describe help topics, which provides a full workflow description. In step 2006, the conformance checker 1310 is downloaded and executed (FIG. 17). In one or more embodiments, the user 2000 downloads the conformance checker (e.g., SCE+ Self-Service Migration Spec Checker) and executes the conformance checker 1310 to find out which points of the source content (e.g. client servers) do not conform (are non-conformant) with the spec.

Figure 18:
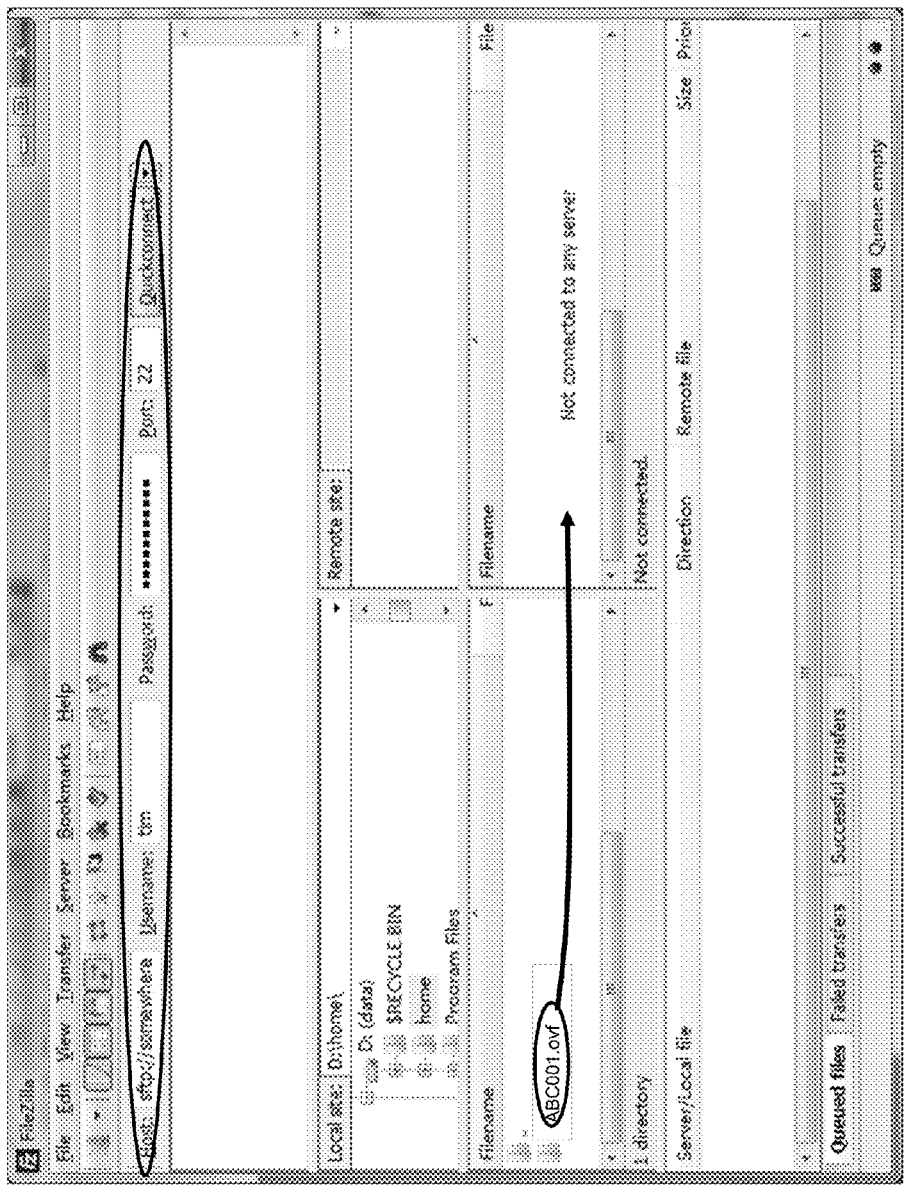
FIG. 18 presents a computer screen display associated with the flow chart of FIG. 14, according to an aspect of the invention.
Figure 18:

After the source content is made conformant with the spec, an image of the conformant source content is uploaded to the image library 2009 at the cloud site in step 2008 (FIG. 18). In some embodiments, the conformant image is uploaded using ftp/scp tools. In some embodiments, the migration orchestrator 2013 checks the conformance of the image with the spec, reserves virtual memory or space in the cloud, enables access to the images, imports the images, and registers the images with the cloud management software. When the image upload completes, the migration orchestrator starts a workflow to process the image. The workflow process makes sure the image is valid, that the necessary meta-data is available, and verifies the virtual image has passed the conformance check. The workflow process records status as well as logs of the actions such that they are available for the user to review at a later point in time.

Figure 19:
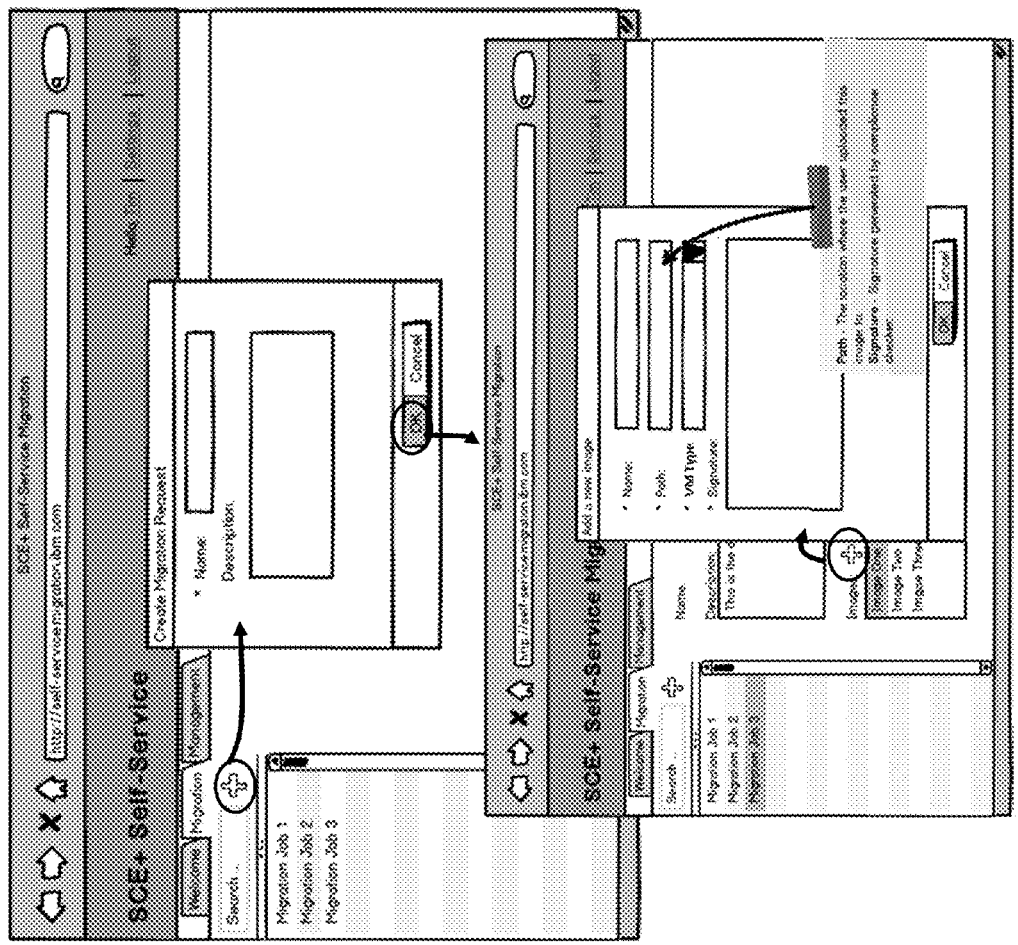
FIG. 19 presents a computer screen display associated with the flow chart of FIG. 14, according to an aspect of the invention.
Figure 19:
Figure 20:
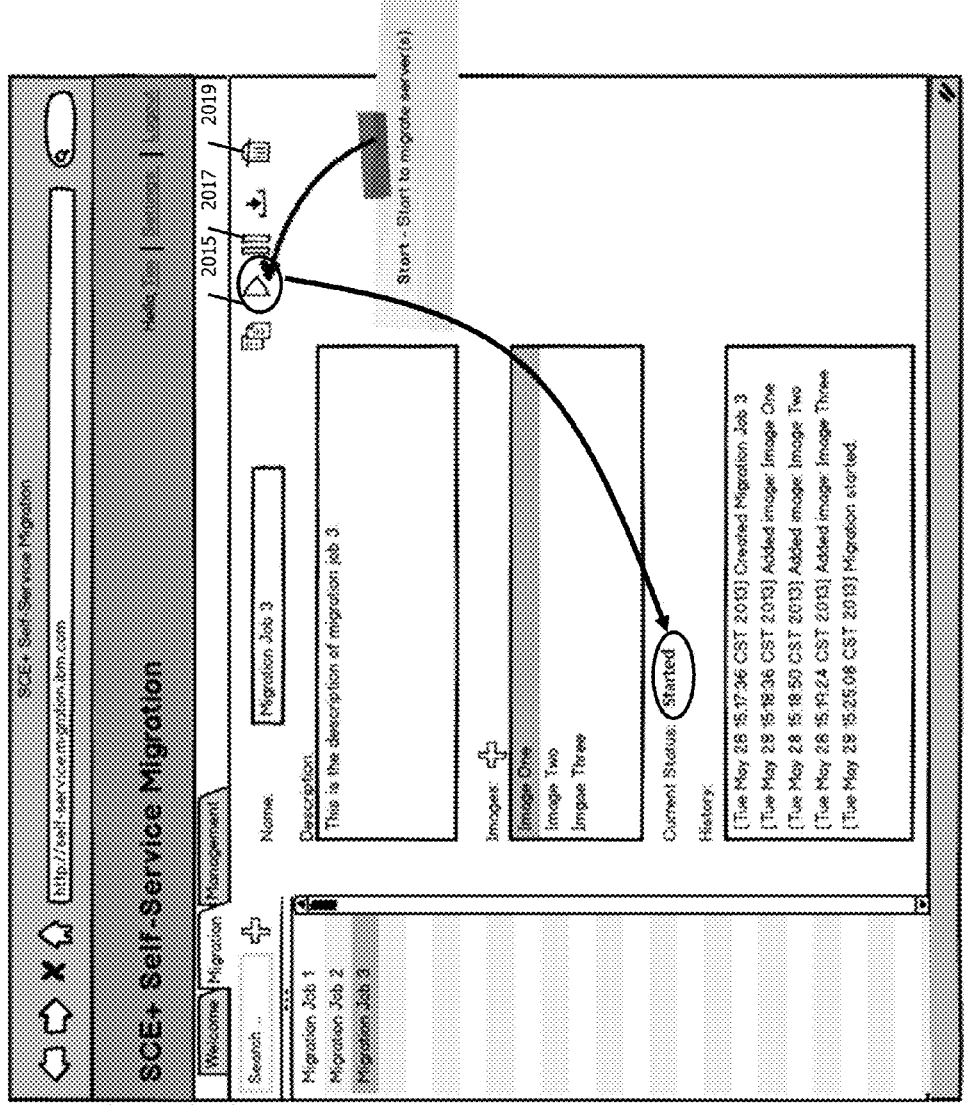
FIG. 20 presents a computer screen display associated with the flow chart of FIG. 14, according to an aspect of the invention.
Figure 20:
Figure 21:
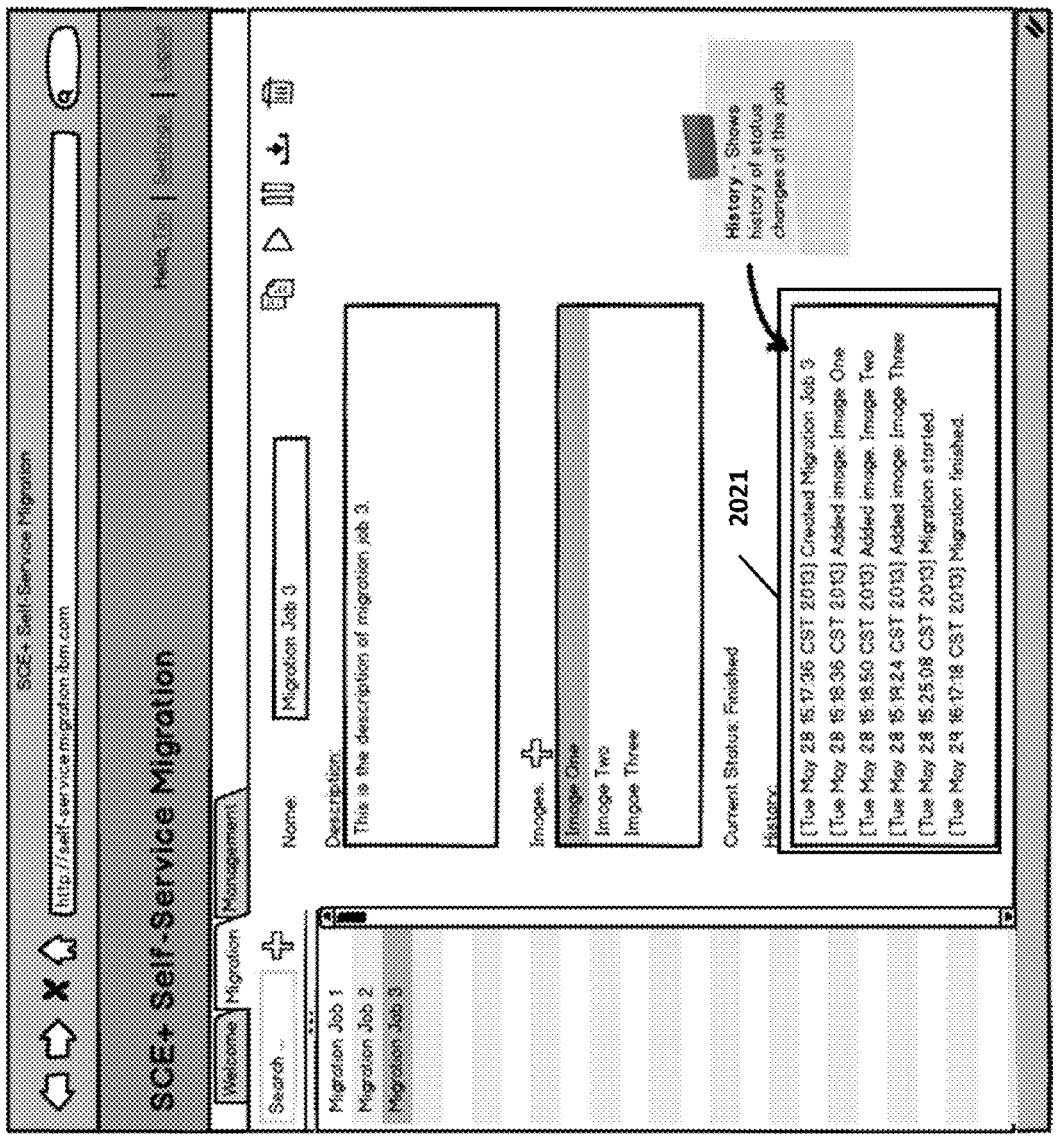
FIG. 21 presents a computer screen display associated with the flow chart of FIG. 14, according to an aspect of the invention.
Figure 21:
Figure 22:
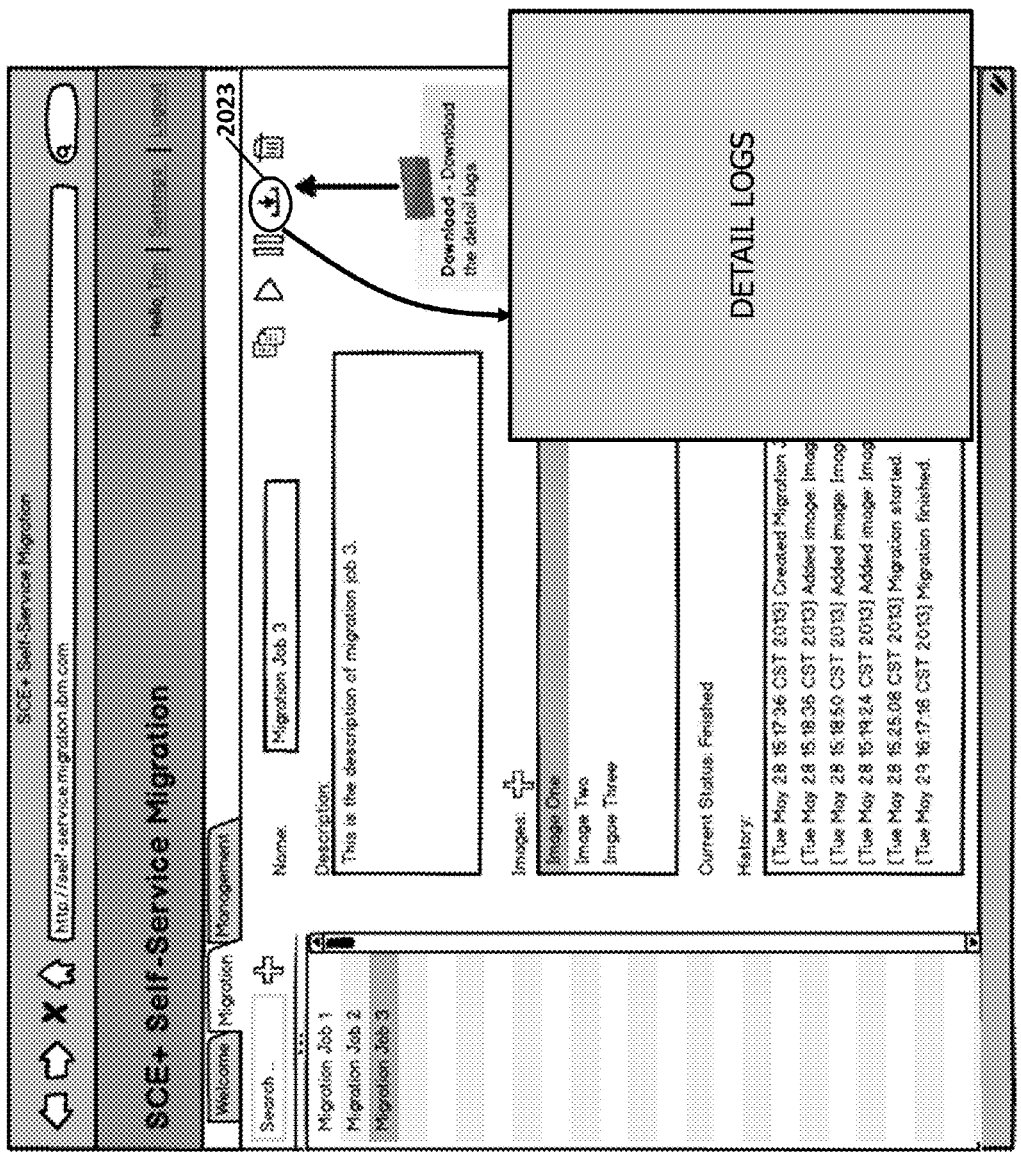
FIG. 22 presents a computer screen display associated with the flow chart of FIG. 14, according to an aspect of the invention.
Figure 22:
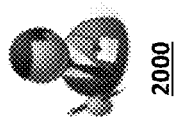
Figure 23:
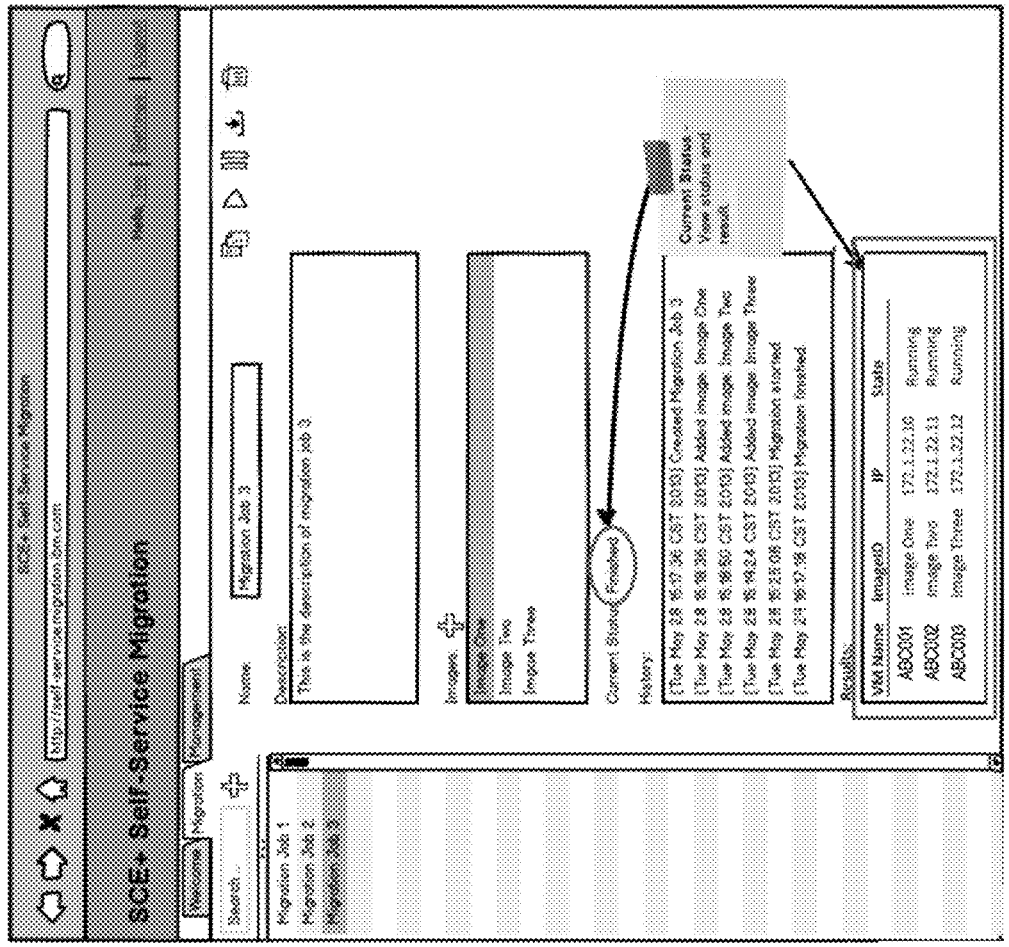
FIG. 23 presents a computer screen display associated with the flow chart of FIG. 14, according to an aspect of the invention.

The method then proceeds to step 2010, where a migration request is created (FIG. 19). In some embodiments, the user 2000 inputs request details (e.g., name description, images, etc.). In some embodiments, an image library receives the image from the source server, and the migration server, which receives the migration request, can reside on the same server or on a different server. Then in step 2012, the request is submitted to a SSMP server 2013 (FIG. 20). In one or more embodiments, the request is submitted by pushing or selecting a start button 2015. The migration may also be paused or deleted by pressing the corresponding button 2017, 2019, respectively. In step 2014, the user 2000 checks/monitors the status of the migration (FIG. 21) from the portal. In some embodiments, a window 2021 provides a history of status changes for the migration. In step 2016, the user 2000 checks the migration logs (FIG. 22). In one or more embodiments, the user 2000 reviews/downloads the details migration task logs by pressing the download the details log button 2023. Then in step 2018, the user 2000 obtains migration results (FIG. 23). In one or more embodiments, after a successful migration, the user reviews the migration results, and the process ends.

One or more embodiments of the invention provide a separated process phase for role-based operations, compared with existing cloud migration processes. In one or more embodiments of the invention, customers use conformance checkers to guide adjustments that transform the source content (e.g., source server or source application) into a cloud conformant one. These adjustments are performed by the customer, at their own pace, and outside the migration window. As such, customers with sophisticated information technology (IT) staff can perform the migration at a lesser cost than with existing cloud migration processes. Additionally, some embodiments of the invention provide for a medium based handshake for image/data sync to both the cloud and the customer. In some embodiments of the invention, the use of the conformance checker decreases the migration failure rate; and the user/customer making the adjustments on their own, in their own time, minimizes the actual migration window. Note that some embodiments are differentiated from prior techniques because the role is not limited to a migration subject matter expert or an individual who is an expert in the target cloud and has elevated privileges in the target cloud.

It will accordingly be appreciated that one or more embodiments provide a method including receiving a conformance checker on a system that contains hostable content. For example, a source system downloads conformance checker software. Another step includes executing the conformance checker. For example, the source system runs the conformance checker software. A further step includes evaluating one or more results provided by the conformance checker. For example, a human operator invokes the conformance checker on source content. A still further step includes migrating the hostable content to a destination host in accordance with the evaluating step. This step can be carried out, for example, using the migration orchestrator or other known migration technique; over a network; by transporting physical media; or the like. This method can be carried out, for example, with the particular machines shown in FIGS. 13 and 20 as described above, implemented in software running on one or more hardware processors. Corresponding apparatuses and computer program products are also provided. Furthermore in this regard, see FIG. 20 for image migration, and see FIG. 13 for a conformance checker and also the client-side conformance checker described above.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the most general case, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). However, one or more embodiments are particularly significant in the context of a cloud or virtual machine environment. Reference is made back to FIGS. 1-3 and accompanying text.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and or sub-modules/sub-blocks in FIG. 5, such as the server side module 502 and client side module 504; and in FIGS. 10 and 14, such as the conformance checker module 1310 downloaded by the source system, a migration orchestrator 1308, and a specification module. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a conformance checker on a system that contains hostable content, wherein the hostable content runs on the system;
checking, by executing the conformance checker, whether the hostable content conforms to a specification that defines technical requirements for running the hostable content on a destination host;
outputting, from the conformance checker, one or more results of the checking;
evaluating the one or more results output from the conformance checker and determining at least one negative result of the evaluation;
remediating the at least one negative result of the evaluation; and
migrating the hostable content to the destination host in accordance with the remediating step;
further comprising determining whether the destination host supports an ability to remediate the at least one negative result after migration of the hostable content to the destination host; and
further comprising remediating the at least one negative result, including generating remediated hostable content in conformance with the specification, prior to migration upon determining that the destination host does not support the ability to remediate the at least one negative result after migration, wherein the migration of the hostable content is a migration of the remediated hostable content.

2. The method of claim 1 wherein the system that contains hostable content comprises a source system which downloads the conformance checker.

3. The method of claim 1 wherein remediating the at least one negative result occurs automatically.

4. The method of claim 1 wherein checking whether the hostable content conforms to the specification provided by the destination host further comprises comparing one or more items of the hostable content to one or more rules of the specification.

5. The method of claim 4 further comprising providing a non-conformance report including each item of the hostable content that is not in conformance with the one or more rules.

6. The method of claim 5 wherein the non-conformance report includes information related to technical possibility, risk, labor, cost and degree of change for each non-conforming item.

7. The method of claim 1 further comprising uploading an image of a conformant hostable content to a server prior to migrating the hostable content to the destination host.

8. The method of claim 7 further comprising:
creating a migration request; and
submitting the migration request to a migration server.

9. The method of claim 8 wherein an image library receives the image from a source server and the migration server receives the migration request.

10. The method of claim 9, further comprising collocating said source server and said migration server on a same physical machine.

11. The method of claim 9, further comprising locating said source server and said migration server on different physical machines.

12. The method of claim 8 further comprising monitoring the migration.

13. A non-transitory computer readable medium comprising computer executable instructions which when executed by a computer cause the computer to perform the method of:
receiving a conformance checker on a system that contains hostable content, wherein the hostable content runs on the system;
checking, by executing the conformance checker, whether the hostable content conforms to a specification that defines technical requirements for running the hostable content on a destination host;
outputting, from the conformance checker, one or more results of the checking;
facilitating evaluating the one or more results output from the conformance checker and determining at least one negative result of the evaluation;
facilitating remediating the at least one negative result of the evaluation; and
migrating the hostable content to the destination host in accordance with the remediating step;
the method further comprising determining whether the destination host supports an ability to remediate the at least one negative result after migration of the hostable content to the destination host; and
the method further comprising remediating the at least one negative result, including generating remediated hostable content in conformance with the specification, prior to migration upon determining that the destination host does not support the ability to remediate the at least one negative result after migration, wherein the migration of the hostable content is a migration of the remediated hostable content.

14. An apparatus comprising:
a memory; and
at least one processor, coupled to said memory, and operative to:
receive a conformance checker on a system that contains hostable content, wherein the hostable content runs on the system;
check, by executing the conformance checker, whether the hostable content conforms to a specification that defines technical requirements for running the hostable content on a destination host;
output, from the conformance checker, one or more results of the checking;
facilitate evaluating one or more results output from the conformance checker and determining at least one negative result of the evaluation;
facilitate remediating the at least one negative result of the evaluation; and
migrate the hostable content to the destination host in accordance with the remediating step;
wherein the at least one processor is further operative to:
determine whether the destination host supports an ability to remediate the at least one negative result after migration of the hostable content to the destination host; and
remediate the at least one negative result, including generating remediated hostable content in conformance with the specification, prior to migration upon determining that the destination host does not support the ability to remediate the at least one negative result after migration, wherein the migration of the hostable content is a migration of the remediated hostable content.

* * * * *